United States Patent
Winters et al.

(10) Patent No.: US 10,474,352 B1
(45) Date of Patent: *Nov. 12, 2019

(54) DYNAMIC EXPANSION OF DATA VISUALIZATIONS

(71) Applicant: Domo, Inc., American Fork, UT (US)

(72) Inventors: Alan Winters, Lindon, UT (US); Amir H. Raubvogel, Redwood City, CA (US)

(73) Assignee: DOMO, INC., American Fork, UT (US)

( * ) Notice: Subject to any disclaimer, the term of this patent is extended or adjusted under 35 U.S.C. 154(b) by 691 days.

This patent is subject to a terminal disclaimer.

(21) Appl. No.: 14/884,597

(22) Filed: Oct. 15, 2015

Related U.S. Application Data

(63) Continuation of application No. 13/535,019, filed on Jun. 27, 2012, now Pat. No. 9,202,297.

(Continued)

(51) Int. Cl.
   *G06F 3/0488* (2013.01)
   *G06T 11/20* (2006.01)
   (Continued)

(52) U.S. Cl.
   CPC ........ *G06F 3/04883* (2013.01); *G06F 3/0482* (2013.01); *G06F 3/04842* (2013.01);
   (Continued)

(58) Field of Classification Search
   CPC ..... G09G 5/36; G06F 3/0482; G06F 3/04883; G06F 2203/04807; G06F 3/0481; G06F 3/04847; G06F 3/04855; G06F 3/0485; G06F 9/4443; G06F 3/04823; G06F 3/03547; G06F 3/048; G06F 3/04817; G06F 3/04812; G06F 3/04815; G06F 3/0484; G06F 3/04842; G06F 3/041; G06F 3/0412; G06F 3/0414; G06F 2203/04806; G06F 2203/04808; G06T 11/60; G06T 19/00; G06T 11/00

See application file for complete search history.

(56) References Cited

U.S. PATENT DOCUMENTS 5,359,712 A  10/1994  Cohen et al.
5,375,201 A  12/1994  Davoust
(Continued)

*Primary Examiner* — Devona E Faulk
*Assistant Examiner* — Charles L Beard
(74) *Attorney, Agent, or Firm* — Patent Law Works LLP

(57) ABSTRACT

A user can dynamically invoke and control the display of secondary data visualizations based on a selected element of a primary data visualization. Previews of the secondary data visualizations are presented as the user interacts with the primary visualization. In response to user input, previews can be dynamically expanded, allowing a user to dynamically "drill down" into selected elements of the primary data visualization. Any suitable input mechanism can be used, including for example, a gesture such as a two-finger spreading motion to invoke previews of available secondary visualizations, wherein the axis defined by two points of contact determines which of the displayed previews of secondary visualizations is highlighted and/or expanded. In various embodiments, a hierarchy of visualizations can be established, and the user can navigate among two or more levels of visualizations in the same interactive manner.

19 Claims, 16 Drawing Sheets

Related U.S. Application Data

(60) Provisional application No. 61/506,912, filed on Jul. 12, 2011.

(51) Int. Cl.
*G06F 3/0484* (2013.01)
*G06F 3/0482* (2013.01)

(52) U.S. Cl.
CPC ........ *G06F 3/04845* (2013.01); *G06T 11/206* (2013.01); *G06F 2203/04808* (2013.01)

(56) References Cited

U.S. PATENT DOCUMENTS

| | | | |
|---|---|---|---|
| 5,416,895 A | 5/1995 | Anderson et al. | |
| 5,423,033 A | 6/1995 | Yuen | |
| 5,461,708 A | 10/1995 | Kahn | |
| 5,550,964 A | 8/1996 | Davoust | |
| 5,581,678 A | 12/1996 | Kahn | |
| 5,586,240 A | 12/1996 | Khan et al. | |
| 5,600,775 A | 2/1997 | King et al. | |
| 5,625,767 A | 4/1997 | Bartell et al. | |
| 5,634,133 A | 5/1997 | Kelley | |
| 5,689,667 A * | 11/1997 | Kurtenbach | G06F 3/0482 |
| | | | 715/810 |
| 5,737,557 A | 4/1998 | Sullivan | |
| 5,844,558 A | 12/1998 | Kumar et al. | |
| 5,929,854 A | 7/1999 | Ross | |
| 5,933,823 A | 8/1999 | Cullen et al. | |
| 5,970,471 A | 10/1999 | Hill | |
| 5,990,888 A | 11/1999 | Blades et al. | |
| 6,016,502 A | 1/2000 | Haneda et al. | |
| 6,023,280 A | 2/2000 | Becker et al. | |
| 6,298,174 B1 | 10/2001 | Lantrip et al. | |
| 6,484,168 B1 | 11/2002 | Pennock et al. | |
| 6,529,217 B1 | 3/2003 | Maguire, III et al. | |
| 6,577,304 B1 | 6/2003 | Yablonski et al. | |
| 6,613,100 B2 | 9/2003 | Miller | |
| 6,626,959 B1 | 9/2003 | Moise et al. | |
| 6,707,454 B1 | 3/2004 | Barg et al. | |
| 6,904,427 B1 * | 6/2005 | Hagiwara | G06F 17/30696 |
| 6,940,509 B1 | 9/2005 | Crow et al. | |
| 6,985,898 B1 | 1/2006 | Ripley et al. | |
| 6,995,768 B2 | 2/2006 | Jou et al. | |
| 7,002,580 B1 | 2/2006 | Aggala et al. | |
| 7,103,837 B2 | 9/2006 | Sato | |
| 7,249,328 B1 | 7/2007 | Davis | |
| 7,353,183 B1 | 4/2008 | Musso | |
| 7,421,648 B1 | 9/2008 | Davis | |
| 7,522,176 B2 | 4/2009 | Tolle et al. | |
| 7,546,522 B2 | 6/2009 | Tolle et al. | |
| 7,605,804 B2 * | 10/2009 | Wilson | G06F 3/0488 |
| | | | 345/173 |
| 7,685,159 B2 | 3/2010 | Mitchell et al. | |
| 7,689,933 B1 | 3/2010 | Parsons | |
| 7,705,847 B2 | 4/2010 | Helfman et al. | |
| 7,788,606 B2 | 8/2010 | Patel et al. | |
| 7,809,582 B2 | 10/2010 | Wessling et al. | |
| 8,089,653 B2 | 1/2012 | Kobashi | |
| 8,099,674 B2 | 1/2012 | Mackinlay et al. | |
| 8,130,211 B2 * | 3/2012 | Abernathy | G06F 3/04883 |
| | | | 345/156 |
| 8,145,600 B1 * | 3/2012 | Lewis | G06F 17/30011 |
| | | | 707/638 |
| 8,176,096 B2 | 5/2012 | Allyn et al. | |
| 8,185,839 B2 * | 5/2012 | Jalon | G06F 17/30126 |
| | | | 715/730 |
| 8,201,096 B2 | 6/2012 | Robert et al. | |
| 8,214,747 B1 | 7/2012 | Yankovich et al. | |
| 8,245,156 B2 * | 8/2012 | Mouilleseaux | G06F 3/04883 |
| | | | 715/834 |
| 8,261,194 B2 | 9/2012 | Billiard et al. | |
| 8,286,098 B2 * | 10/2012 | Ju | G06F 3/04817 |
| | | | 455/414.1 |
| 8,289,316 B1 * | 10/2012 | Reisman | G06F 3/0425 |
| | | | 345/173 |
| 8,291,349 B1 * | 10/2012 | Park | G06F 3/04883 |
| | | | 715/705 |
| 8,291,350 B1 * | 10/2012 | Park | G06F 3/04883 |
| | | | 715/705 |
| 8,296,654 B2 | 10/2012 | Ahlberg et al. | |
| 8,434,007 B2 | 4/2013 | Morita | |
| 8,456,466 B1 * | 6/2013 | Reisman | G06F 3/0425 |
| | | | 345/419 |
| 8,463,790 B1 | 6/2013 | Joshi et al. | |
| 8,468,466 B2 * | 6/2013 | Cragun | G06F 3/04812 |
| | | | 715/834 |
| 8,499,284 B2 | 7/2013 | Pich et al. | |
| 8,549,432 B2 * | 10/2013 | Warner | G06F 3/0482 |
| | | | 715/811 |
| 8,566,700 B2 | 10/2013 | Ueda | |
| 8,578,294 B2 * | 11/2013 | Eom | G06F 3/0482 |
| | | | 715/769 |
| 8,579,814 B2 | 11/2013 | Fotiades et al. | |
| 8,621,391 B2 | 12/2013 | Leffert et al. | |
| 8,624,858 B2 * | 1/2014 | Fyke | G06F 3/0416 |
| | | | 178/18.01 |
| 8,627,233 B2 * | 1/2014 | Cragun | G06F 3/04812 |
| | | | 715/823 |
| 8,645,863 B2 | 2/2014 | Mandic et al. | |
| 8,661,358 B2 | 2/2014 | Duncker et al. | |
| 8,667,418 B2 | 3/2014 | Chaudhri et al. | |
| 8,671,343 B2 * | 3/2014 | Oberstein | G06F 3/0488 |
| | | | 345/111 |
| 8,683,389 B1 | 3/2014 | Bar-Yam et al. | |
| 8,686,962 B2 * | 4/2014 | Christie | G06F 3/044 |
| | | | 345/173 |
| 8,707,192 B2 | 4/2014 | Robert et al. | |
| 8,713,467 B1 | 4/2014 | Goldenberg et al. | |
| 8,738,814 B1 * | 5/2014 | Cronin | G06F 3/04883 |
| | | | 710/15 |
| 8,745,280 B1 * | 6/2014 | Cronin | G06F 3/0488 |
| | | | 710/15 |
| 8,799,826 B2 * | 8/2014 | Missig | G06F 3/0486 |
| | | | 715/801 |
| 8,806,336 B2 * | 8/2014 | Miyazawa | G06F 3/0482 |
| | | | 715/702 |
| 8,812,947 B1 * | 8/2014 | Maoz | G06F 17/246 |
| | | | 715/212 |
| 8,826,178 B1 * | 9/2014 | Zhang | G06F 1/1694 |
| | | | 715/810 |
| 8,826,181 B2 | 9/2014 | Mouilleseaux et al. | |
| 8,863,019 B2 | 10/2014 | Pourshahid et al. | |
| 8,878,879 B2 * | 11/2014 | Lee | G06F 3/0482 |
| | | | 345/173 |
| 8,886,622 B1 | 11/2014 | Parent et al. | |
| 8,914,740 B1 | 12/2014 | Joos et al. | |
| 8,959,423 B2 * | 2/2015 | Hammoud | G06F 3/04812 |
| | | | 715/205 |
| 9,026,944 B2 * | 5/2015 | Kotler | G06F 3/0482 |
| | | | 715/828 |
| 9,081,494 B2 * | 7/2015 | Migos | G06F 3/04883 |
| 9,086,794 B2 | 7/2015 | Gil et al. | |
| 9,098,182 B2 * | 8/2015 | Migos | G06F 3/04883 |
| 9,104,365 B2 * | 8/2015 | Sirpal | G06F 3/1438 |
| 9,182,900 B2 * | 11/2015 | Choi | G06F 3/0488 |
| 9,195,368 B2 * | 11/2015 | Kuscher | G06F 3/0482 |
| 9,201,589 B2 * | 12/2015 | Nasraoui | G06F 3/0488 |
| 9,202,297 B1 * | 12/2015 | Winters | G06T 11/206 |
| 9,223,496 B2 * | 12/2015 | Howard | G06F 3/017 |
| 9,235,978 B1 * | 1/2016 | Charlton | G06F 17/30867 |
| 9,244,562 B1 * | 1/2016 | Rosenberg | G06F 3/04847 |
| 9,250,789 B2 | 2/2016 | Kobayashi | |
| 9,251,722 B2 * | 2/2016 | Miyazawa | G01C 21/3664 |
| 9,261,989 B2 * | 2/2016 | Kuscher | G06F 3/041 |
| 9,280,263 B2 | 3/2016 | Kim | |
| 9,292,199 B2 * | 3/2016 | Choi | G06F 3/04883 |
| 9,299,170 B1 * | 3/2016 | Moon | G06T 11/003 |
| 9,310,907 B2 * | 4/2016 | Victor | G06F 3/0485 |
| 9,310,993 B2 * | 4/2016 | Choi | G06F 3/0482 |
| 9,329,769 B2 | 5/2016 | Sekiguchi et al. | |

(56) References Cited

U.S. PATENT DOCUMENTS

| | | | |
|---|---|---|---|
| 9,354,780 B2* | 5/2016 | Miyake | G06F 3/0482 |
| 9,367,198 B2 | 6/2016 | Radakovitz et al. | |
| 9,390,349 B2* | 7/2016 | Awano | G06K 15/002 |
| 9,395,826 B1* | 7/2016 | Cronin | G06F 3/03547 |
| 9,400,997 B2 | 7/2016 | Beaver et al. | |
| 9,424,333 B1 | 8/2016 | Bisignani et al. | |
| 9,459,791 B2 | 10/2016 | Mouilleseaux et al. | |
| 9,465,452 B2* | 10/2016 | Nishizawa | G06F 3/0346 |
| 9,477,315 B2* | 10/2016 | Fujimura | G02B 27/01 |
| 9,513,799 B2* | 12/2016 | Fleizach | G06F 3/033 |
| 9,582,187 B2* | 2/2017 | Gil | G06F 3/0482 |
| 9,588,645 B2* | 3/2017 | Heo | G06F 3/04817 |
| 9,612,736 B2* | 4/2017 | Lee | G06F 3/0486 |
| 9,652,056 B2* | 5/2017 | Park | G06F 3/03547 |
| 9,658,766 B2 | 5/2017 | Nan et al. | |
| 9,678,343 B2* | 6/2017 | Kuehne | G06F 3/011 |
| 9,716,825 B1* | 7/2017 | Manzari | H04N 5/23216 |
| 9,721,375 B1* | 8/2017 | Rivard | G06T 13/80 |
| 9,733,734 B2* | 8/2017 | Chase | G06F 3/03547 |
| 9,733,796 B2 | 8/2017 | Warner | |
| 9,747,018 B2* | 8/2017 | Han | G06F 3/017 |
| 9,804,726 B1 | 10/2017 | Joos et al. | |
| 9,817,548 B2* | 11/2017 | Lai | G06F 3/0482 |
| 9,875,023 B2* | 1/2018 | Brown | G06F 3/04886 |
| 9,880,701 B2* | 1/2018 | Hyun | G06F 3/04817 |
| 9,881,645 B2* | 1/2018 | Novikoff | G11B 27/031 |
| 9,886,183 B2* | 2/2018 | Lee | G06F 3/0488 |
| 9,996,171 B2* | 6/2018 | Chase | G06F 3/03547 |
| 10,078,421 B2* | 9/2018 | Jeon | G06F 3/0482 |
| 10,168,817 B2* | 1/2019 | Hiraga | G06F 3/04883 |
| 10,254,927 B2* | 4/2019 | Missig | G06F 3/04883 |
| 2002/0087894 A1 | 7/2002 | Foley et al. | |
| 2002/0091678 A1 | 7/2002 | Miller et al. | |
| 2003/0028504 A1 | 2/2003 | Burgoon et al. | |
| 2003/0069873 A1 | 4/2003 | Fox et al. | |
| 2003/0074292 A1 | 4/2003 | Masuda | |
| 2003/0128883 A1 | 7/2003 | Kim et al. | |
| 2003/0158855 A1 | 8/2003 | Farnham et al. | |
| 2003/0167278 A1 | 9/2003 | Baudel | |
| 2003/0193502 A1 | 10/2003 | Patel et al. | |
| 2004/0150668 A1* | 8/2004 | Myers | G06F 3/0421 715/771 |
| 2004/0189717 A1 | 9/2004 | Conally et al. | |
| 2004/0230599 A1 | 11/2004 | Moore et al. | |
| 2005/0068320 A1 | 3/2005 | Jaeger | |
| 2005/0091254 A1 | 4/2005 | Stabb et al. | |
| 2005/0091612 A1 | 4/2005 | Stabb et al. | |
| 2005/0134578 A1 | 6/2005 | Chambers et al. | |
| 2005/0246643 A1 | 11/2005 | Gusmorino et al. | |
| 2005/0275622 A1 | 12/2005 | Patel et al. | |
| 2005/0278625 A1 | 12/2005 | Wessling et al. | |
| 2006/0004718 A1 | 1/2006 | McCully et al. | |
| 2006/0020623 A1 | 1/2006 | Terai et al. | |
| 2006/0026535 A1* | 2/2006 | Hotelling | G06F 3/0418 715/863 |
| 2006/0036950 A1 | 2/2006 | Himberger et al. | |
| 2006/0041178 A1 | 2/2006 | Viswanathan et al. | |
| 2006/0095865 A1* | 5/2006 | Rostom | G06F 3/0482 715/810 |
| 2006/0136819 A1 | 6/2006 | Tolle et al. | |
| 2006/0242164 A1 | 10/2006 | Evans et al. | |
| 2006/0244735 A1* | 11/2006 | Wilson | G06F 3/0488 345/173 |
| 2006/0288284 A1 | 12/2006 | Peters et al. | |
| 2007/0008300 A1* | 1/2007 | Yang | G06F 3/04886 345/173 |
| 2007/0022000 A1 | 1/2007 | Bodart et al. | |
| 2007/0061714 A1 | 3/2007 | Stuple et al. | |
| 2007/0083911 A1* | 4/2007 | Madden | G06F 3/0482 725/135 |
| 2007/0094592 A1 | 4/2007 | Turner et al. | |
| 2007/0124677 A1* | 5/2007 | de los Reyes | G06F 9/451 715/705 |
| 2007/0171716 A1 | 7/2007 | Wright et al. | |
| 2007/0179969 A1 | 8/2007 | Finley et al. | |
| 2007/0186173 A1 | 8/2007 | Both et al. | |
| 2007/0186177 A1 | 8/2007 | Both et al. | |
| 2007/0186186 A1 | 8/2007 | Both et al. | |
| 2007/0189737 A1* | 8/2007 | Chaudhri | G06F 3/0482 386/234 |
| 2007/0245238 A1 | 10/2007 | Fugitt et al. | |
| 2007/0252821 A1* | 11/2007 | Hollemans | G06F 3/0416 345/173 |
| 2007/0256029 A1* | 11/2007 | Maxwell | G06F 3/0482 715/834 |
| 2007/0271528 A1 | 11/2007 | Park et al. | |
| 2008/0037051 A1 | 2/2008 | Otsubo | |
| 2008/0115049 A1 | 5/2008 | Tolle et al. | |
| 2008/0136754 A1 | 6/2008 | Tsuzaki et al. | |
| 2008/0168404 A1* | 7/2008 | Ording | G06F 3/0485 715/863 |
| 2008/0180458 A1 | 7/2008 | Favart et al. | |
| 2008/0195639 A1 | 8/2008 | Freeman et al. | |
| 2008/0244454 A1 | 10/2008 | Shibaike | |
| 2008/0307343 A1 | 12/2008 | Robert et al. | |
| 2008/0309632 A1* | 12/2008 | Westerman | G06F 3/038 345/173 |
| 2009/0006318 A1 | 1/2009 | Lehtipalo et al. | |
| 2009/0007012 A1* | 1/2009 | Mandic | G06F 3/0481 715/810 |
| 2009/0007017 A1* | 1/2009 | Anzures | G06F 3/04883 715/835 |
| 2009/0024411 A1 | 1/2009 | Albro et al. | |
| 2009/0070301 A1 | 3/2009 | McLean et al. | |
| 2009/0077501 A1 | 3/2009 | Partridge et al. | |
| 2009/0096812 A1 | 4/2009 | Boixel et al. | |
| 2009/0106674 A1 | 4/2009 | Bray et al. | |
| 2009/0150177 A1 | 6/2009 | Buck et al. | |
| 2009/0164171 A1 | 6/2009 | Wold et al. | |
| 2009/0210814 A1 | 8/2009 | Agrusa et al. | |
| 2009/0235155 A1 | 9/2009 | Ueda | |
| 2009/0282325 A1 | 11/2009 | Radakovitz et al. | |
| 2009/0284478 A1* | 11/2009 | De la Torre Baltierra | G06F 3/04883 345/173 |
| 2009/0307213 A1 | 12/2009 | Deng et al. | |
| 2009/0307622 A1 | 12/2009 | Jalon et al. | |
| 2009/0307626 A1 | 12/2009 | Jalon et al. | |
| 2009/0315848 A1* | 12/2009 | Ku | G06F 3/0416 345/173 |
| 2009/0319897 A1 | 12/2009 | Kotler et al. | |
| 2009/0327213 A1 | 12/2009 | Choudhary | |
| 2009/0327955 A1 | 12/2009 | Mouilleseaux et al. | |
| 2009/0327963 A1* | 12/2009 | Mouilleseaux | G06F 3/0482 715/834 |
| 2009/0327964 A1* | 12/2009 | Mouilleseaux | G06F 3/0482 715/834 |
| 2010/0005008 A1 | 1/2010 | Duncker et al. | |
| 2010/0005411 A1 | 1/2010 | Duncker et al. | |
| 2010/0031203 A1* | 2/2010 | Morris | G06F 3/04883 715/863 |
| 2010/0067048 A1 | 3/2010 | Suzuki | |
| 2010/0070254 A1 | 3/2010 | Tsai et al. | |
| 2010/0077354 A1* | 3/2010 | Russo | G06F 3/0482 715/834 |
| 2010/0080491 A1 | 4/2010 | Ohnishi | |
| 2010/0083172 A1 | 4/2010 | Breeds et al. | |
| 2010/0083190 A1* | 4/2010 | Roberts | G06F 3/04883 715/863 |
| 2010/0087322 A1 | 4/2010 | Yuan et al. | |
| 2010/0095234 A1* | 4/2010 | Lane | G06F 3/038 715/773 |
| 2010/0097338 A1* | 4/2010 | Miyashita | G06F 3/04883 345/173 |
| 2010/0100849 A1 | 4/2010 | Fram | |
| 2010/0138766 A1 | 6/2010 | Nakajima | |
| 2010/0157354 A1 | 6/2010 | Darwish | |
| 2010/0161374 A1 | 6/2010 | Horta et al. | |
| 2010/0162152 A1 | 6/2010 | Allyn et al. | |
| 2010/0185962 A1 | 7/2010 | Zhang et al. | |
| 2010/0185989 A1* | 7/2010 | Shiplacoff | G06F 3/0416 715/856 |

(56) References Cited

U.S. PATENT DOCUMENTS

| | | |
|---|---|---|
| 2010/0188353 A1 | 7/2010 | Yoon et al. |
| 2010/0192102 A1* | 7/2010 | Chmielewski ...... G06F 3/04817 715/834 |
| 2010/0192103 A1* | 7/2010 | Cragun ............... G06F 3/04817 715/834 |
| 2010/0194778 A1 | 8/2010 | Robertson et al. |
| 2010/0199202 A1 | 8/2010 | Becker |
| 2010/0205563 A1 | 8/2010 | Haapsaari et al. |
| 2010/0211895 A1 | 8/2010 | Mistry et al. |
| 2010/0218115 A1 | 8/2010 | Curtin et al. |
| 2010/0231536 A1 | 9/2010 | Chaudhri et al. |
| 2010/0235726 A1* | 9/2010 | Ording ................. G06F 1/1626 715/234 |
| 2010/0235771 A1 | 9/2010 | Gregg, III |
| 2010/0238176 A1 | 9/2010 | Guo et al. |
| 2010/0251151 A1 | 9/2010 | Alsbury et al. |
| 2010/0251179 A1* | 9/2010 | Cragun ............... G06F 3/04812 715/834 |
| 2010/0251180 A1* | 9/2010 | Cragun ............... G06F 3/04812 715/834 |
| 2010/0275144 A1 | 10/2010 | Dejoras et al. |
| 2010/0275159 A1 | 10/2010 | Matsubara et al. |
| 2010/0283750 A1 | 11/2010 | Kang et al. |
| 2010/0299637 A1* | 11/2010 | Chmielewski ........ G06F 3/0482 715/834 |
| 2010/0299638 A1* | 11/2010 | Choi ................... G06F 3/04883 715/835 |
| 2010/0306702 A1* | 12/2010 | Warner ............... G06F 3/04817 715/811 |
| 2010/0312462 A1 | 12/2010 | Gueziec et al. |
| 2010/0312803 A1 | 12/2010 | Gong et al. |
| 2010/0332511 A1 | 12/2010 | Stockton et al. |
| 2011/0001628 A1* | 1/2011 | Miyazawa ........ G01C 21/3664 340/686.1 |
| 2011/0004821 A1* | 1/2011 | Miyazawa .......... G06F 3/04883 715/702 |
| 2011/0016390 A1* | 1/2011 | Oh ....................... G06F 3/0482 715/702 |
| 2011/0016433 A1 | 1/2011 | Shipley |
| 2011/0018806 A1 | 1/2011 | Yano |
| 2011/0041098 A1* | 2/2011 | Kajiya ................ G06F 3/04815 715/849 |
| 2011/0050562 A1* | 3/2011 | Schoen ................... G01V 1/34 345/156 |
| 2011/0055691 A1 | 3/2011 | Carlen et al. |
| 2011/0055760 A1* | 3/2011 | Drayton ................ G06F 3/0482 715/834 |
| 2011/0069019 A1* | 3/2011 | Carpendale ........... G06F 3/0425 345/173 |
| 2011/0074171 A1* | 3/2011 | Maehara ................ B25J 9/1612 294/86.4 |
| 2011/0074696 A1 | 3/2011 | Rapp et al. |
| 2011/0074716 A1 | 3/2011 | Ono |
| 2011/0074718 A1 | 3/2011 | Yeh et al. |
| 2011/0074719 A1* | 3/2011 | Yeh .................... G06F 3/04883 345/173 |
| 2011/0077851 A1* | 3/2011 | Ogawa ............... G01C 21/3614 701/532 |
| 2011/0115814 A1* | 5/2011 | Heimendinger .... G06F 3/04883 345/619 |
| 2011/0141031 A1* | 6/2011 | McCullough ......... G06F 3/0481 345/173 |
| 2011/0148796 A1* | 6/2011 | Hollemans .............. G06F 3/044 345/173 |
| 2011/0173569 A1 | 7/2011 | Howes et al. |
| 2011/0179376 A1 | 7/2011 | Berestov et al. |
| 2011/0188760 A1 | 8/2011 | Wright et al. |
| 2011/0199639 A1* | 8/2011 | Tani ................... G06F 3/04886 358/1.15 |
| 2011/0205163 A1* | 8/2011 | Hinckley .............. G06F 3/0483 345/173 |
| 2011/0209048 A1 | 8/2011 | Scott et al. |
| 2011/0209088 A1* | 8/2011 | Hinckley .............. G06F 3/0488 715/810 |
| 2011/0209093 A1* | 8/2011 | Hinckley ............ G06F 3/04817 715/834 |
| 2011/0212717 A1 | 9/2011 | Rhoads et al. |
| 2011/0234503 A1* | 9/2011 | Fitzmaurice .......... G06F 3/0235 345/173 |
| 2011/0270851 A1 | 11/2011 | Mishina et al. |
| 2011/0271233 A1 | 11/2011 | Radakovitz et al. |
| 2011/0276603 A1 | 11/2011 | Bojanic et al. |
| 2011/0279363 A1 | 11/2011 | Shoji et al. |
| 2011/0283231 A1 | 11/2011 | Richstein et al. |
| 2011/0291988 A1 | 12/2011 | Bamji et al. |
| 2011/0298708 A1* | 12/2011 | Hsu ......................... G06F 1/169 345/158 |
| 2011/0302490 A1 | 12/2011 | Koarai |
| 2011/0320458 A1 | 12/2011 | Karana |
| 2012/0011437 A1 | 1/2012 | James et al. |
| 2012/0032901 A1* | 2/2012 | Kwon ................. G06F 3/04883 345/173 |
| 2012/0036434 A1* | 2/2012 | Oberstein ............. G06F 3/0482 715/702 |
| 2012/0050192 A1* | 3/2012 | Kobayashi ........... G06F 3/0488 345/173 |
| 2012/0056836 A1 | 3/2012 | Cha et al. |
| 2012/0056878 A1* | 3/2012 | Miyazawa ............. G06F 1/1626 345/419 |
| 2012/0081375 A1* | 4/2012 | Robert ............... G06F 17/30126 345/522 |
| 2012/0084644 A1* | 4/2012 | Robert ..................... G06F 9/451 715/255 |
| 2012/0089933 A1 | 4/2012 | Garand et al. |
| 2012/0092286 A1 | 4/2012 | O'Prey et al. |
| 2012/0127206 A1 | 5/2012 | Thompson et al. |
| 2012/0133585 A1* | 5/2012 | Han ......................... G06F 3/017 345/158 |
| 2012/0144335 A1 | 6/2012 | Abeln et al. |
| 2012/0154269 A1* | 6/2012 | Oki ..................... G06F 3/04815 345/156 |
| 2012/0162265 A1 | 6/2012 | Heinrich et al. |
| 2012/0166470 A1* | 6/2012 | Baumgaertel ...... G06F 17/30554 707/769 |
| 2012/0174034 A1 | 7/2012 | Chae et al. |
| 2012/0180002 A1* | 7/2012 | Campbell ........... G06F 3/04883 715/863 |
| 2012/0210275 A1* | 8/2012 | Park ...................... G06F 3/0482 715/810 |
| 2012/0254783 A1* | 10/2012 | Pourshahid ......... G06F 3/04883 715/771 |
| 2012/0262489 A1* | 10/2012 | Caliendo, Jr. ............. G09G 5/36 345/652 |
| 2012/0284753 A1* | 11/2012 | Roberts ............ H04N 21/41407 725/45 |
| 2012/0293427 A1* | 11/2012 | Mukai ................ G06F 3/04883 345/173 |
| 2012/0306748 A1* | 12/2012 | Fleizach ................. G06F 3/033 345/161 |
| 2012/0319977 A1* | 12/2012 | Kuge ..................... G06F 3/044 345/173 |
| 2013/0002802 A1* | 1/2013 | Mock .................. H04L 12/1827 348/14.03 |
| 2013/0007577 A1 | 1/2013 | Hammoud |
| 2013/0007583 A1 | 1/2013 | Hammoud |
| 2013/0019175 A1 | 1/2013 | Kotler et al. |
| 2013/0019205 A1 | 1/2013 | Gil et al. |
| 2013/0033448 A1* | 2/2013 | Yano ................... G06F 3/04883 345/173 |
| 2013/0036380 A1 | 2/2013 | Symons |
| 2013/0047125 A1 | 2/2013 | Kangas et al. |
| 2013/0067391 A1* | 3/2013 | Pittappilly ............ G06F 3/0488 715/784 |
| 2013/0076668 A1* | 3/2013 | Maeda ................. G06F 3/04845 345/173 |
| 2013/0080444 A1 | 3/2013 | Wakefield et al. |
| 2013/0093782 A1 | 4/2013 | Wakefield et al. |
| 2013/0097177 A1 | 4/2013 | Fan et al. |
| 2013/0097544 A1 | 4/2013 | Parker et al. |

(56) References Cited

U.S. PATENT DOCUMENTS

| | | | |
|---|---|---|---|
| 2013/0104079 A1* | 4/2013 | Yasui | G06F 3/0482 715/834 |
| 2013/0114913 A1 | 5/2013 | Nagarajan et al. | |
| 2013/0127758 A1* | 5/2013 | Kim | G06F 3/041 345/173 |
| 2013/0127911 A1* | 5/2013 | Brown | G06F 3/04886 345/649 |
| 2013/0145244 A1* | 6/2013 | Rothschiller | G06F 17/246 715/212 |
| 2013/0145316 A1* | 6/2013 | Heo | G06F 3/04817 715/810 |
| 2013/0169549 A1* | 7/2013 | Seymour | G06F 3/0488 345/173 |
| 2013/0174032 A1 | 7/2013 | Tse et al. | |
| 2013/0201106 A1* | 8/2013 | Naccache | G06F 3/0481 345/158 |
| 2013/0204862 A1 | 8/2013 | Marchiori | |
| 2013/0219340 A1* | 8/2013 | Linge | G06F 3/0482 715/834 |
| 2013/0222265 A1* | 8/2013 | Smith | G06F 3/04883 345/173 |
| 2013/0222340 A1 | 8/2013 | Ito | |
| 2013/0235071 A1* | 9/2013 | Ubillos | G06F 3/0484 345/600 |
| 2013/0254662 A1* | 9/2013 | Dunko | G06F 3/01 715/716 |
| 2013/0275898 A1* | 10/2013 | Fujimoto | G06F 3/04842 715/765 |
| 2013/0293672 A1* | 11/2013 | Suzuki | H04N 5/23238 348/36 |
| 2013/0307861 A1* | 11/2013 | Lang | G06F 3/04883 345/582 |
| 2013/0321340 A1* | 12/2013 | Seo | G06F 1/1641 345/174 |
| 2013/0328804 A1* | 12/2013 | Oshima | G06F 3/04842 345/173 |
| 2013/0346906 A1* | 12/2013 | Farago | G06F 3/04883 715/776 |
| 2014/0019899 A1* | 1/2014 | Cheng | G06F 3/048 715/770 |
| 2014/0022192 A1* | 1/2014 | Hatanaka | G06F 3/041 345/173 |
| 2014/0033127 A1* | 1/2014 | Choi | G06F 3/0488 715/825 |
| 2014/0047380 A1 | 2/2014 | Mak | |
| 2014/0071063 A1* | 3/2014 | Kuscher | G06F 3/041 345/173 |
| 2014/0075388 A1* | 3/2014 | Kuscher | G06F 3/0482 715/834 |
| 2014/0078102 A1* | 3/2014 | Araki | G06F 3/016 345/174 |
| 2014/0089828 A1* | 3/2014 | Okuma | G03G 15/5016 715/765 |
| 2014/0092100 A1* | 4/2014 | Chen | G06F 3/0482 345/473 |
| 2014/0101579 A1* | 4/2014 | Kim | G06F 3/0486 715/761 |
| 2014/0111422 A1* | 4/2014 | Chow | G06F 3/0482 345/156 |
| 2014/0111516 A1 | 4/2014 | Hall et al. | |
| 2014/0129564 A1* | 5/2014 | Kritt | G06F 17/30126 707/741 |
| 2014/0157200 A1* | 6/2014 | Jeon | G06F 3/0482 715/834 |
| 2014/0157210 A1* | 6/2014 | Katz | G06F 3/017 715/863 |
| 2014/0173457 A1 | 6/2014 | Wang et al. | |
| 2014/0173530 A1* | 6/2014 | Mesguich Havilio | G06F 3/04883 715/863 |
| 2014/0189581 A1* | 7/2014 | Kawannata | G06F 3/04845 715/798 |
| 2014/0210759 A1* | 7/2014 | Toriyama | G06F 17/2735 345/173 |
| 2014/0215365 A1* | 7/2014 | Hiraga | G06F 3/04883 715/765 |
| 2014/0229871 A1* | 8/2014 | Tai | G06F 3/04883 715/765 |
| 2014/0245217 A1* | 8/2014 | Asahara | G06F 3/0488 715/781 |
| 2014/0267084 A1* | 9/2014 | Krulce | G06F 3/0416 345/173 |
| 2014/0282145 A1 | 9/2014 | Dewan | |
| 2014/0313142 A1* | 10/2014 | Yairi | G06F 3/016 345/173 |
| 2014/0331179 A1 | 11/2014 | Tullis et al. | |
| 2014/0340204 A1* | 11/2014 | O'Shea | G08C 17/02 340/12.54 |
| 2014/0351738 A1* | 11/2014 | Kokovidis | A61B 5/7445 715/771 |
| 2015/0009157 A1* | 1/2015 | Chung | G06F 3/041 345/173 |
| 2015/0012854 A1 | 1/2015 | Choi et al. | |
| 2015/0022432 A1* | 1/2015 | Stewart | G06F 3/04842 345/156 |
| 2015/0029095 A1* | 1/2015 | Gomez | G06F 3/017 345/156 |
| 2015/0029553 A1* | 1/2015 | Fujimoto | G06F 3/0412 358/1.15 |
| 2015/0033165 A1* | 1/2015 | Yoo | G06F 3/04842 715/765 |
| 2015/0035800 A1* | 2/2015 | Uchiyama | G06F 3/0421 345/175 |
| 2015/0062046 A1* | 3/2015 | Cho | G06F 3/017 345/173 |
| 2015/0066356 A1* | 3/2015 | Kirsch | G01C 21/3664 701/425 |
| 2015/0067555 A1* | 3/2015 | Joo | G06F 3/04842 715/765 |
| 2015/0074615 A1* | 3/2015 | Han | G06K 9/00033 715/863 |
| 2015/0106709 A1* | 4/2015 | Kritt | G06F 3/04883 715/708 |
| 2015/0135109 A1* | 5/2015 | Zambetti | G06F 3/0488 715/767 |
| 2015/0143233 A1 | 5/2015 | Weksler et al. | |
| 2015/0153571 A1* | 6/2015 | Ballard | H04W 76/10 345/8 |
| 2015/0160807 A1* | 6/2015 | Vakharia | G06F 16/24 705/26.63 |
| 2015/0160843 A1* | 6/2015 | Kim | G06F 3/04845 715/764 |
| 2015/0169057 A1* | 6/2015 | Shiroor | G06F 3/0482 715/702 |
| 2015/0169096 A1* | 6/2015 | Nishizawa | G02B 27/0172 345/173 |
| 2015/0169530 A1 | 6/2015 | Otero et al. | |
| 2015/0169531 A1 | 6/2015 | Campbell et al. | |
| 2015/0186350 A1* | 7/2015 | Hicks | G06F 17/241 715/230 |
| 2015/0186351 A1* | 7/2015 | Hicks | G06F 17/241 715/232 |
| 2015/0205483 A1* | 7/2015 | Takamura | G06F 3/0488 345/173 |
| 2015/0212688 A1* | 7/2015 | Mcmillan | G06F 3/04815 715/850 |
| 2015/0227308 A1* | 8/2015 | Kim | G06F 3/0486 715/769 |
| 2015/0234562 A1 | 8/2015 | Ording | |
| 2015/0261728 A1 | 9/2015 | Davis | |
| 2015/0268805 A1 | 9/2015 | Patel | |
| 2015/0286636 A1 | 10/2015 | Elkhou et al. | |
| 2015/0301609 A1* | 10/2015 | Park | G06F 3/017 345/173 |
| 2015/0338974 A1* | 11/2015 | Stone | G06F 3/0488 345/173 |
| 2015/0341212 A1 | 11/2015 | Hsiao et al. | |
| 2015/0356160 A1 | 12/2015 | Berwick et al. | |

(56) References Cited

U.S. PATENT DOCUMENTS

| | | | |
|---|---|---|---|
| 2015/0363082 A1* | 12/2015 | Zhao | G06F 3/0481 715/800 |
| 2015/0378978 A1 | 12/2015 | Gross et al. | |
| 2016/0055232 A1 | 2/2016 | Yang et al. | |
| 2016/0070430 A1 | 3/2016 | Kim et al. | |
| 2016/0070461 A1* | 3/2016 | Herbordt | G06F 3/04883 345/178 |
| 2016/0092080 A1* | 3/2016 | Swanson | G06F 3/04845 345/654 |
| 2016/0139695 A1* | 5/2016 | Chase | G06F 3/03547 345/174 |
| 2016/0147308 A1* | 5/2016 | Gelman | G06F 3/01 345/156 |
| 2016/0188181 A1* | 6/2016 | Smith | G06F 3/0416 715/765 |
| 2016/0202892 A1* | 7/2016 | Rath | G06F 3/04847 715/764 |
| 2016/0253086 A1* | 9/2016 | Jiang | G06F 3/048 715/790 |
| 2016/0259528 A1* | 9/2016 | Foss | G06F 3/0482 |
| 2016/0274686 A1* | 9/2016 | Alonso Ruiz | G06F 3/03547 |
| 2016/0274733 A1* | 9/2016 | Hasegawa | G06F 3/048 |
| 2016/0274750 A1 | 9/2016 | Stewart | |
| 2016/0283049 A1* | 9/2016 | Faydi | G06F 3/04883 |
| 2016/0283054 A1* | 9/2016 | Suzuki | G06F 3/0482 |
| 2016/0283081 A1* | 9/2016 | Johnston | G06T 19/006 |
| 2016/0291849 A1* | 10/2016 | Stockwell | G06F 3/04845 |
| 2016/0306328 A1 | 10/2016 | Ko et al. | |
| 2016/0313911 A1 | 10/2016 | Langseth et al. | |
| 2016/0364367 A1 | 12/2016 | Takayama | |
| 2016/0370994 A1* | 12/2016 | Galu, Jr. | G06F 3/04883 |
| 2017/0010781 A1* | 1/2017 | Bostick | G06F 17/211 |
| 2017/0031587 A1* | 2/2017 | Kimoto | G06F 3/04842 |
| 2017/0060819 A1* | 3/2017 | Rucine | G06K 9/00402 |
| 2017/0102838 A1 | 4/2017 | Roy et al. | |
| 2017/0109023 A1* | 4/2017 | Cherna | G06F 3/0484 |
| 2017/0109026 A1* | 4/2017 | Ismailov | G06F 3/04847 |
| 2017/0147188 A1* | 5/2017 | Rong | G06F 3/04815 |
| 2017/0185258 A1 | 6/2017 | Fu | |
| 2017/0185281 A1* | 6/2017 | Park | H04L 12/2803 |
| 2017/0192658 A1* | 7/2017 | Kim | G06F 3/0482 |
| 2017/0193058 A1 | 7/2017 | Fung et al. | |
| 2017/0199651 A1* | 7/2017 | Pintoffl | G06F 3/0488 |
| 2017/0221244 A1* | 8/2017 | Hiraga | G06T 11/60 |
| 2017/0228138 A1* | 8/2017 | Paluka | G06F 3/017 |
| 2017/0269696 A1* | 9/2017 | Naidoo | G05B 19/409 |
| 2017/0269800 A1* | 9/2017 | Park | G06F 3/0486 |
| 2017/0277367 A1* | 9/2017 | Pahud | G06F 3/04883 |
| 2017/0287230 A1* | 10/2017 | Gortler | G06F 3/0488 |
| 2017/0315635 A1* | 11/2017 | Chase | G06F 3/03547 |
| 2017/0315721 A1* | 11/2017 | Merel | G06F 3/04815 |
| 2017/0329458 A1* | 11/2017 | Kanemaru | G06F 3/0425 |
| 2018/0040154 A1* | 2/2018 | Gibb | G06T 11/60 |
| 2018/0069983 A1* | 3/2018 | Cho | G06F 3/0481 |
| 2018/0101239 A1* | 4/2018 | Yin | G06F 3/011 |
| 2018/0152636 A1* | 5/2018 | Yim | G06T 3/0062 |
| 2018/0203596 A1* | 7/2018 | Dhaliwal | G06F 3/04883 |
| 2018/0239519 A1* | 8/2018 | Hinckley | G06F 3/04845 |
| 2018/0239520 A1* | 8/2018 | Hinckley | G06F 3/04845 |
| 2018/0246639 A1* | 8/2018 | Han | G06F 3/04883 |
| 2018/0329623 A1* | 11/2018 | Usami | G06F 3/03547 |
| 2019/0056856 A1* | 2/2019 | Simmons | G06F 3/04847 |
| 2019/0094850 A1* | 3/2019 | Li | B64C 39/024 |
| 2019/0146643 A1* | 5/2019 | Foss | G06F 3/0482 |

\* cited by examiner

DYNAMIC EXPANSION OF DATA VISUALIZATIONS

CROSS-REFERENCE TO RELATED APPLICATION

This application is a continuation of U.S. application Ser. No. 13/535,019, entitled "Dynamic Expansion of Data Visualizations," filed Jun. 27, 2012, which claims the benefit under 35 U.S.C. § 119(e) of U.S. Provisional Application Ser. No. 61/506,912 for "Drill by Expansion," filed Jul. 12, 2011, the entire contents of each of which are incorporated herein by reference.

FIELD OF THE INVENTION

The present invention relates to interactive graphical displays of data visualizations representing quantitative data.

DESCRIPTION OF THE RELATED ART

Electronic devices—such as desktop, laptop, and tablet computers, as well as mobile devices such as smartphones—are often capable of storing and displaying various forms of data visualizations (or "reports") representing quantitative data. Data visualizations can represent any information, such as financial information, marketing information, and/or the like, in any suitable tabular, text-based, and/or graphical format.

It is known in the art to provide interactivity for data visualizations. In many computing environments, including web-based applications such as browsers for presenting web pages, a user can interact with a data visualization so as to change the format and/or nature of the displayed data, to highlight certain elements and/or obscure others, and/or to zoom into and out of a displayed report.

One particular form of interactivity is to provide a mechanism for a user to invoke and/or control the display of secondary reports from a primary report. Yuen, U.S. Pat. No. 5,423,033 for "Report Generation System and Method", issued Jun. 6, 1995, describes a report generation system and method wherein a secondary report can be generated containing detailed information concerning a specific data element of a primary report. A user selects a data element on a primary report; upon activation, a secondary report is generated, using new parameters determined by the particular data element selected by the user.

Yuen's technique, and similar techniques, offer limited functionality as to the type(s) of secondary report that can be generated, and as to the degree of user control of the nature and format of the secondary report. In general, such techniques generate a single type of secondary report based solely on the user's selection of a particular data element. The user is not generally able to interactively select among a plurality of available secondary reports or visualizations directly from the primary report.

SUMMARY

According to various embodiments of the present invention, a user interface is provided—for a computer or other electronic device that displays quantitative data in graphical form—which allows a user to dynamically invoke and control the display of secondary data visualizations based on a selected element of a primary data visualization. In at least one embodiment, previews of these secondary data visualizations are presented in response to user interaction with the primary visualization. In response to user input, one or more of the previews can be dynamically expanded. This allows a user to dynamically "drill down" into selected aspects and/or elements of the primary data visualization, in a manner that is highly user-configurable, interactive, and responsive.

In at least one embodiment, the system and method of the present invention are implemented in such a manner as to respond to direct manipulation of the displayed elements, for example via a touch-sensitive screen. Any touch-sensitive, proximity-sensitive, or gesture-based system can be used. Known gestures such as pinching and rotating can be interpreted in an intuitive manner to provide improved control and feedback in response to user input.

For example, in at least one embodiment, a gesture including a two-finger spreading motion invokes previews of available secondary visualizations for a given element of a displayed primary visualization. The position at which the gesture is performed specifies which data element of the primary visualization is being explored. The axis defined by the two points of contact determines which of the displayed previews of secondary visualizations is to be highlighted and/or expanded; the user can rotate his or her fingers to change the axis and thereby highlight and/or expand different secondary visualizations. In at least one embodiment, the user can tap on a displayed preview to expand it, or can increase the distance between the spread fingers, or perform some other action to cause the displayed preview to be expanded.

As described in more detail herein, in various embodiments, a hierarchy of visualizations can be established, and the user can navigate among primary, secondary, tertiary, and/or additional levels of visualizations in a similar interactive manner. The system and method of the present invention thereby provide an improved level of user control and interactivity in the display of visualizations on an electronic device.

For purposes of the description herein, the terms "report", "data visualization", "visualization", and "graph" are used interchangeably to refer to any suitable representation or representations of quantitative data, with the examples depicted and described herein being provided for illustrative purposes with no intention of limiting the invention to those particular types of visualizations. Such representations can be graphical, tabular, text-based, or any combination thereof.

Further details and variations are described herein.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

System Architecture

According to various embodiments, the present invention can be implemented on any electronic device equipped to receive, store, and present quantitative data. Such an electronic device may be, for example, a desktop computer, laptop computer, smartphone, tablet computer, or the like.

Although the invention is described herein in connection with an implementation in a computer, one skilled in the art will recognize that the techniques of the present invention can be implemented in other contexts, and indeed in any suitable device capable of presenting quantitative data graphically and/or interactively. Accordingly, the following description is intended to illustrate various embodiments of the invention by way of example, rather than to limit the scope of the claimed invention.

Figure 1A:
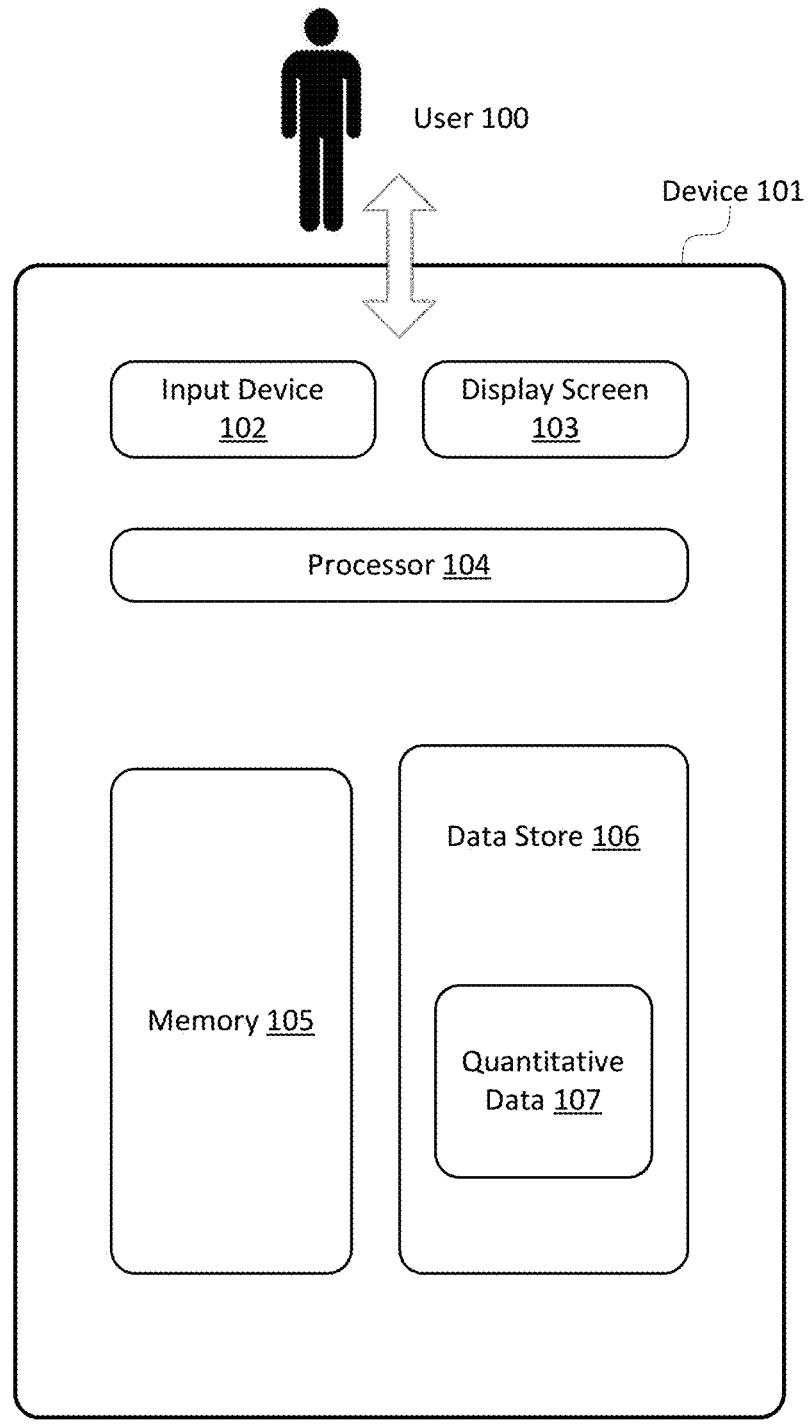
FIG. 1A is a block diagram depicting a hardware architecture for practicing the present invention according to one embodiment of the present invention.

Referring now to FIG. 1A, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, and present quantitative data, and to receive user input in connect with such quantitative data.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. Display screen 103 can be any element that graphically displays quantitative data.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be any magnetic, optical, or electronic storage device for data in digital form; examples include flash memory, magnetic hard drive, CD-ROM, DVD-ROM, or the like. In at least one embodiment, data store 106 stores information describing quantitative data 107.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary to practice the invention.

In at least one embodiment, data store 106 is detachable in the form of a CD-ROM, DVD, flash drive, USB hard drive, or the like. Quantitative data 107 can be entered into such a detachable data store 106 from a source outside of device 101 and later displayed after data store 106 is connected to device 101. In another embodiment, data store 106 is fixed within device 101.

Figure 1B:
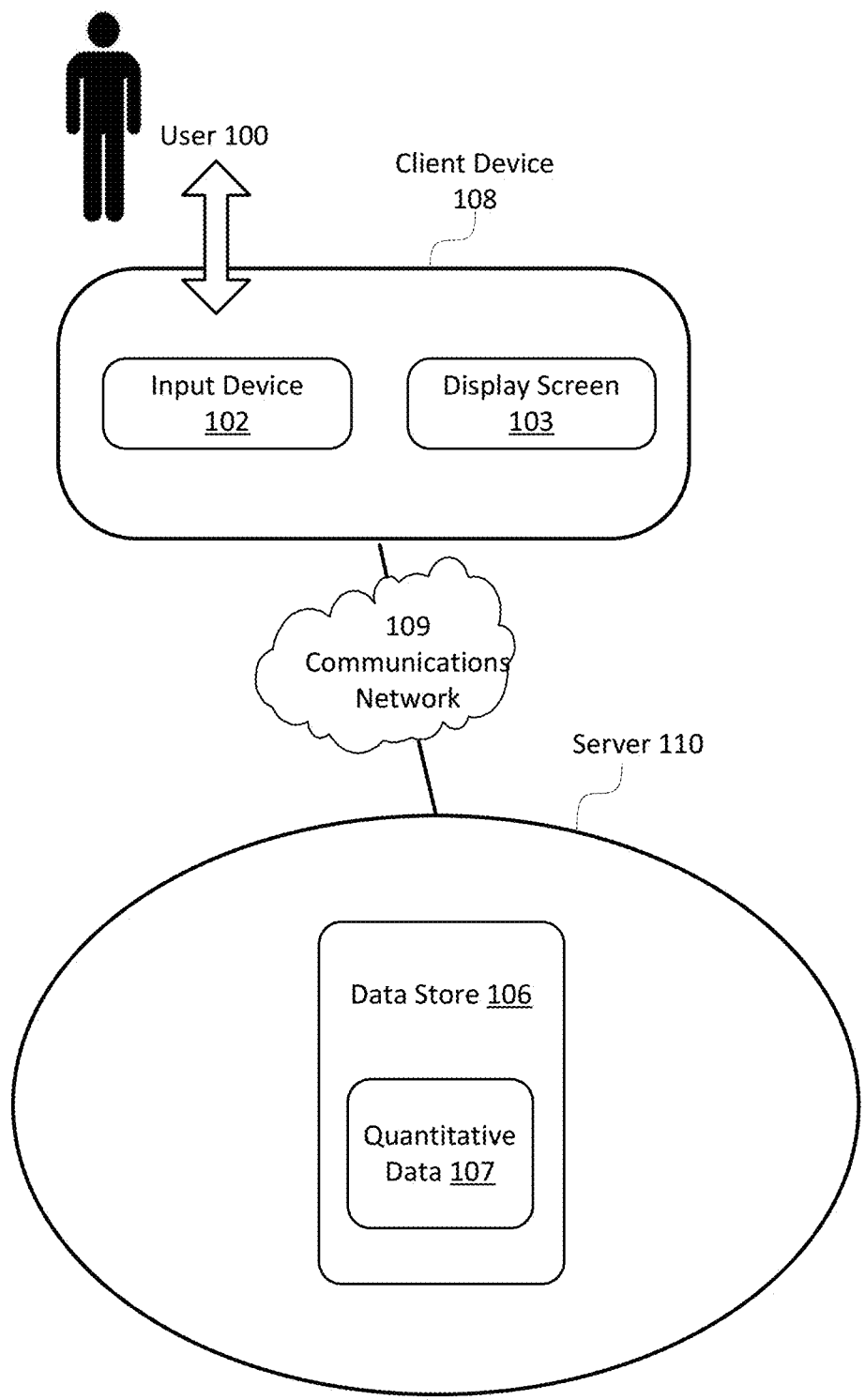
FIG. 1B is a block diagram depicting a hardware architecture for practicing the present invention in a client/server environment, according to one embodiment of the present invention.

Referring now to FIG. 1B, there is shown a block diagram depicting a hardware architecture for practicing the present invention in a client/server environment, according to one embodiment of the present invention. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Data visualizations can be presented as part of such web pages and/or other web-based resources, using known protocols and languages such as HyperText Markup Language (HTML), Java, JavaScript, and the like.

Client device 108 can be any electronic device incorporating input device 102 and display screen 103, such as a desktop computer, laptop computer, personal digital assistant (PDA), cellular telephone, smartphone, music player, handheld computer, tablet computer, kiosk, game system, or the like. Any suitable communications network 109, such as the Internet, can be used as the mechanism for transmitting data between client 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, WiFi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data.

In this implementation, server 110 is responsible for data storage and processing, and incorporates data store 106 for storing quantitative data 107. Server 110 may include additional components as needed for retrieving data from data store 106 in response to requests from client device 108.

In at least one embodiment, quantitative data 107 is organized into one or more well-ordered data sets, with one or more data entries in each set. Data store 106, however, can have any suitable structure. Accordingly, the particular organization of quantitative data 107 within data store 106 need not resemble the form in which it is displayed to user 100. In at least one embodiment, an identifying label is also stored along with each data entry, to be displayed along with each data entry.

Quantitative data can be retrieved from client-based or server-based data store(s), and/or from any other source. In at least one embodiment, input device 102 is configured to receive data entries from user 100, to be added to quantitative data 107 held in data store 106. User 100 may provide such data entries via the hardware and software components described above according to means that are well known to those skilled in the art.

Display screen 103 presents one or more data visualizations that present quantitative data 107 in some visual form, whether text-based, tabular, graphical, interactive, and/or any other suitable format. Such data visualizations may, for example, take the form of bar graphs or other visual graphs that present all of, or some subset of, quantitative data 107. In at least one embodiment where only some of quantitative data 107 is presented at a time, a dynamic control, such as a scrolling mechanism, may be available via input device 102 to change which data entries are currently displayed, and/or to alter the manner in which the data is displayed.

In at least one embodiment, data visualizations presented via display screen 103 include visual cues, such as height, distance, and/or area, to convey the value of each data entry. In at least one embodiment, labels accompany data entries on display screen 103, or can be displayed when user 100 taps on or clicks on a data entry, or causes an on-screen cursor to hover over a data entry.

Method

As described in more detail herein, various embodiments of the present invention provide techniques for dynamically expanding aspects of displayed data visualizations in an interactive manner, such as for example in response to user input.

Figure 2A:
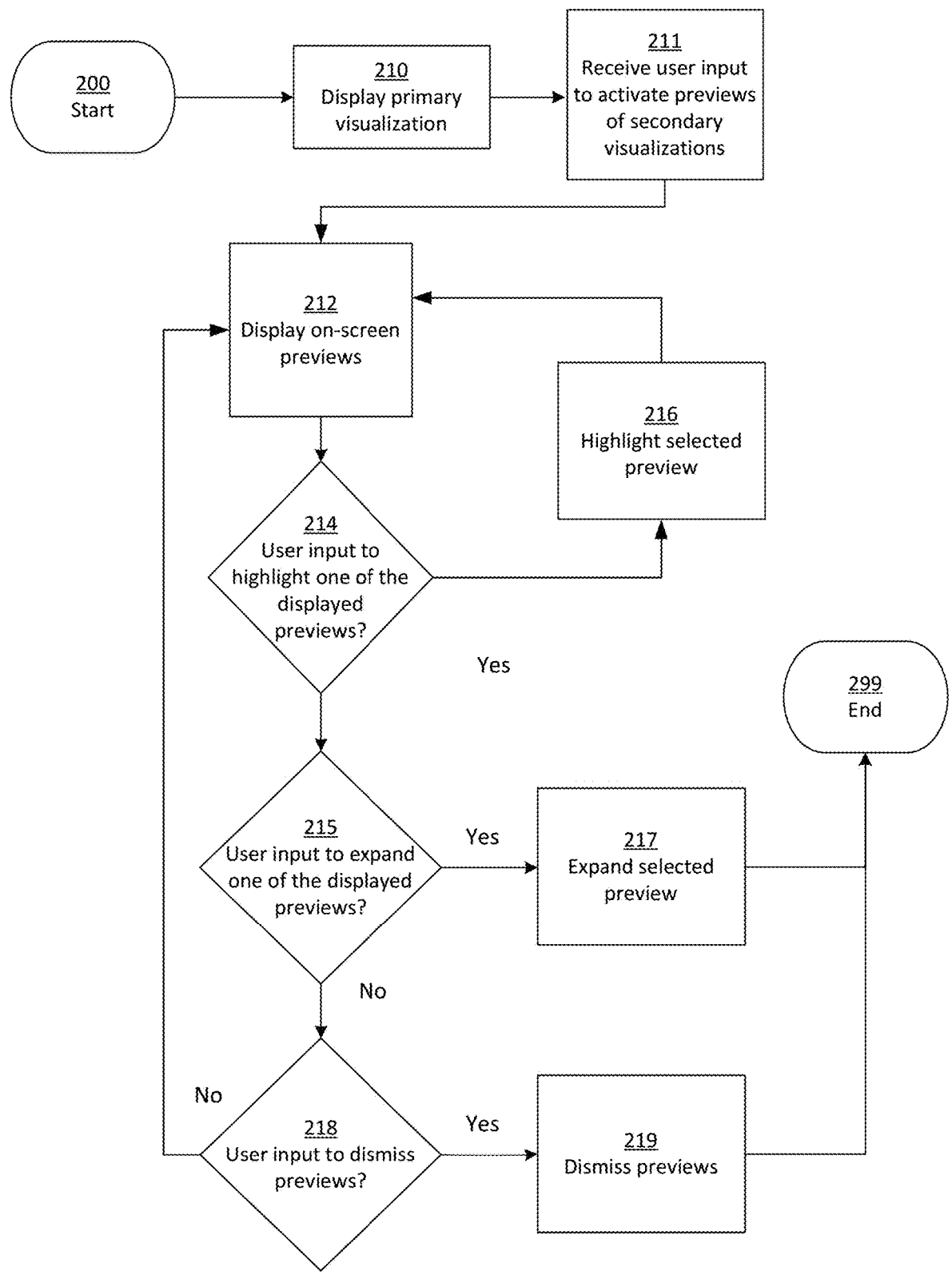
FIG. 2A is a flowchart depicting a method of dynamically expanding a data visualization in response to user input, according to one embodiment of the present invention.

Referring now to FIG. 2A, there is shown a flowchart depicting a method of dynamically expanding a data visualization in response to user input, according to one embodiment of the present invention. Referring also to FIGS. 3 through 10, there is shown a series of screen shots illustrating an example of dynamic expansion of a bar graph data visualization in response to user input, according to one embodiment of the present invention. Although the example of FIGS. 3 through 10 will be used to illustrate the method of FIG. 2A, one skilled in the art will recognize that the particular depictions in the example are merely provided for illustrative purposes, and that the invention can be implemented using other techniques and mechanisms without departing from the essential characteristics of the invention as set forth in the claims.

Figure 3:
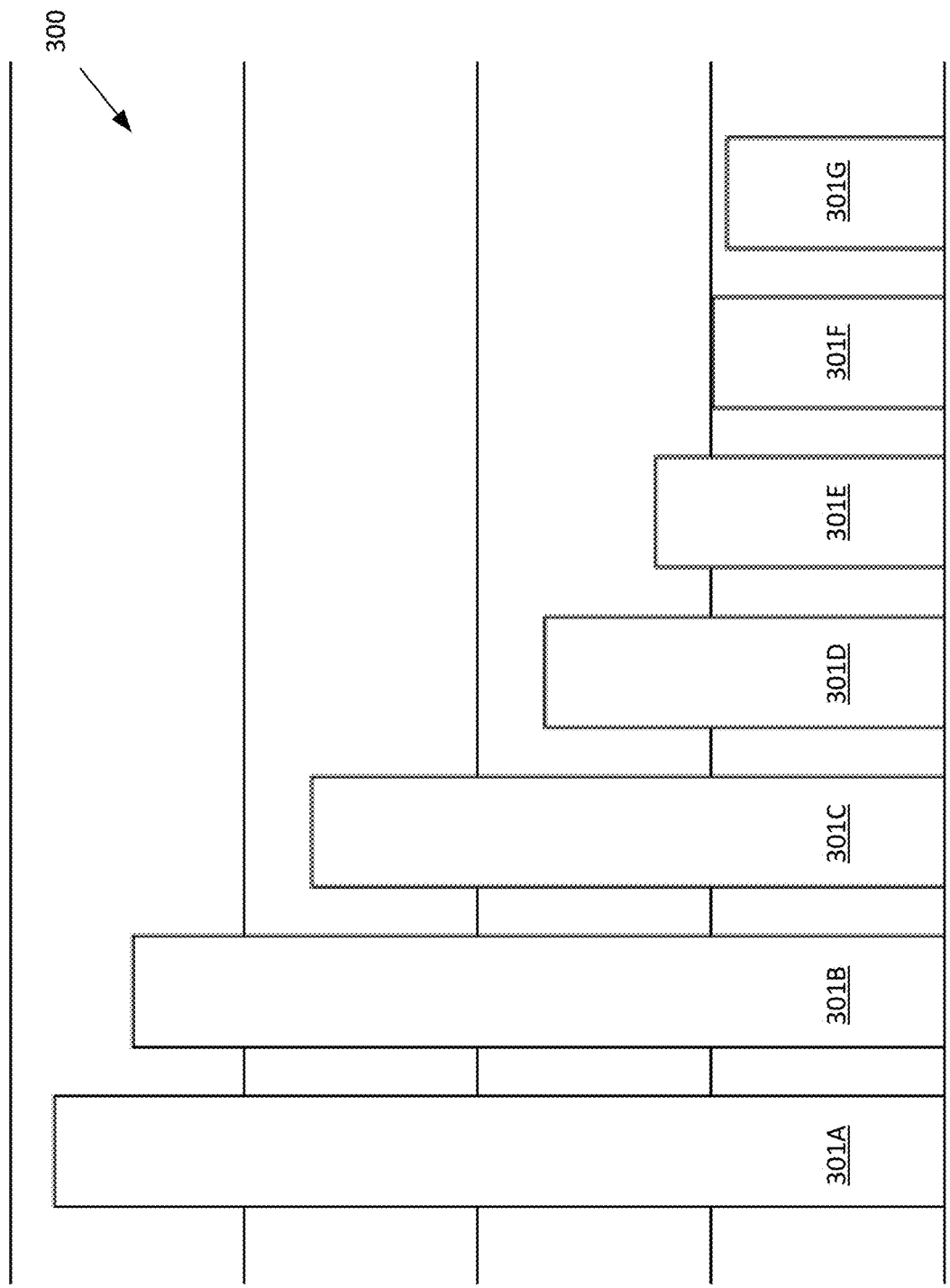
FIGS. 3 through 10 are a series of screen shots illustrating an example of dynamic expansion of a bar graph data visualization in response to user input, according to one embodiment of the present invention.

A primary visualization is displayed 210. The primary visualization can be any representation of quantitative data 107, such as a graph, table, chart, and/or the like. FIG. 3 depicts an en example of a primary visualization in the form of a bar graph 300. Bar graph 300 includes a number of rectangles 301A-301G, each representing a value corresponding to a data entry. For example, the height of each rectangle 301 can indicate the value of the corresponding data entry. Bar graph 300 can include labels to indicate the scale of the vertical axis, and to identify each of the rectangles 301A-301G as being associated with a point in time or some other relevant data category. Such labels are not shown in the examples presented herein.

According to various embodiments, user 100 can interact with the primary visualization in any of a number of different ways. In at least one embodiment, display screen 103 is a touch-sensitive screen, allowing user 100 to interact with the primary visualization by touching the screen or causing a stylus or other object to touch the screen. In at least one embodiment, user 100 can move an on-screen cursor, via an input device 102 such as a mouse, trackball, touchpad, keyboard, five-way switch, and/or any other suitable device, to point to and interact with various areas of the primary visualization. Such interactions may include resizing, moving, scrolling, and/or reformatting the primary visualization, and/or performing any other type of operation in connection with the visualization.

In at least one embodiment, user 100 can provide input causing one or more secondary visualization(s) to be displayed. Such secondary visualization(s) may provide more details regarding a particular aspect or element of the primary visualization (such as a rectangle 301 of graph 300), and/or they may present data in a different form than the primary visualization. For example, a secondary visualization may depict the same or similar data as that displayed in the first visualization, but displayed according to a different dimension or in a different format or scale. As another example, a secondary visualization may depict a subset or superset of the data displayed in the first visualization.

As an example, a primary data visualization may depict total yearly sales. Secondary visualizations associated with such a primary visualization may include total yearly sales subdivided by various categories such as:

Total yearly sales by salesperson
Total yearly sales by sales channel
Total yearly sales by product line
Total yearly sales by industry
Total yearly sales by marketing campaign
Total yearly sales by customer role In at least one embodiment, the input to activate a secondary visualization may include, for example, tapping or clicking on a particular element of the primary visualization, or activating a keyboard command, or any other suitable technique. The position at which such input is provided may determine the particular aspect of the primary visualization to be expanded or presented in the secondary visualization, and/or it may determine the format and/or nature of the secondary visualization. For example, tapping on a particular rectangle 301 may cause secondary visualization(s) associated with a corresponding data value to be made available.

In at least one embodiment, a set of previews of available secondary visualizations can be presented, to allow user 100 to select a desired secondary visualization more intelligently, and to give user 100 a sense of what kind of secondary visualizations are available. Accordingly, in response to receiving 211 user input to activate previews of secondary visualizations, previews are displayed 212. In the example described above, previews could be displayed for the various visualizations depicting total yearly sales subdivided by the above-listed categories.

Any suitable form of input can be provided for activating previews of available secondary visualizations. In one example, a pinch gesture is used, as described in more detail herein. Alternatively, input for activating previews of available secondary visualizations can be provided in the form of tapping, gesturing, clicking, keyboard input, interaction with on-screen buttons or links, and/or the like. Voice command can also be used.

The position at which the user's input is provided may determine which previews are displayed; for example, tapping on a particular rectangle 301 may activate display of previews for secondary visualization(s) associated with a data value corresponding to that rectangle 301.

Figure 4:
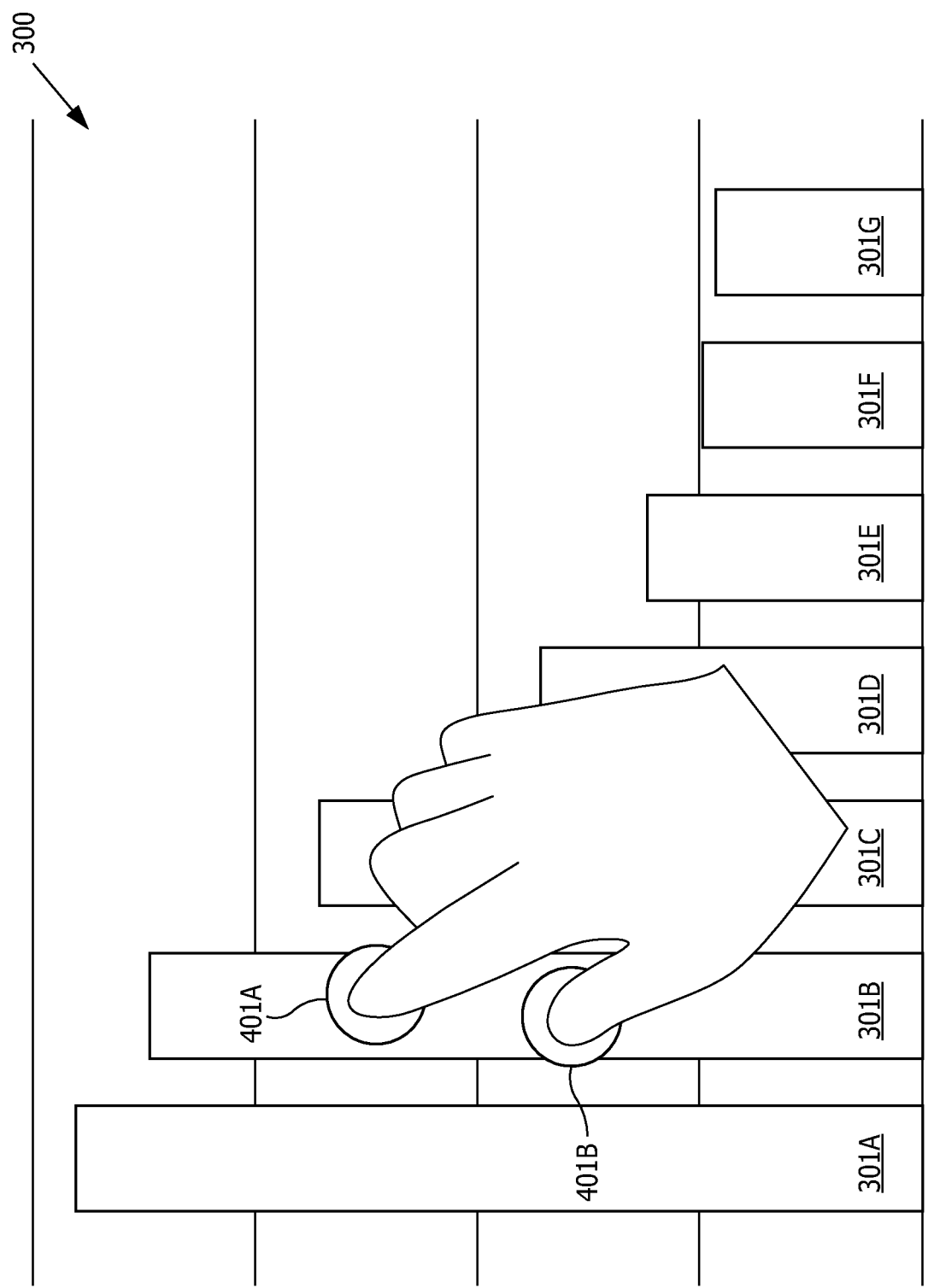
Figure 5:
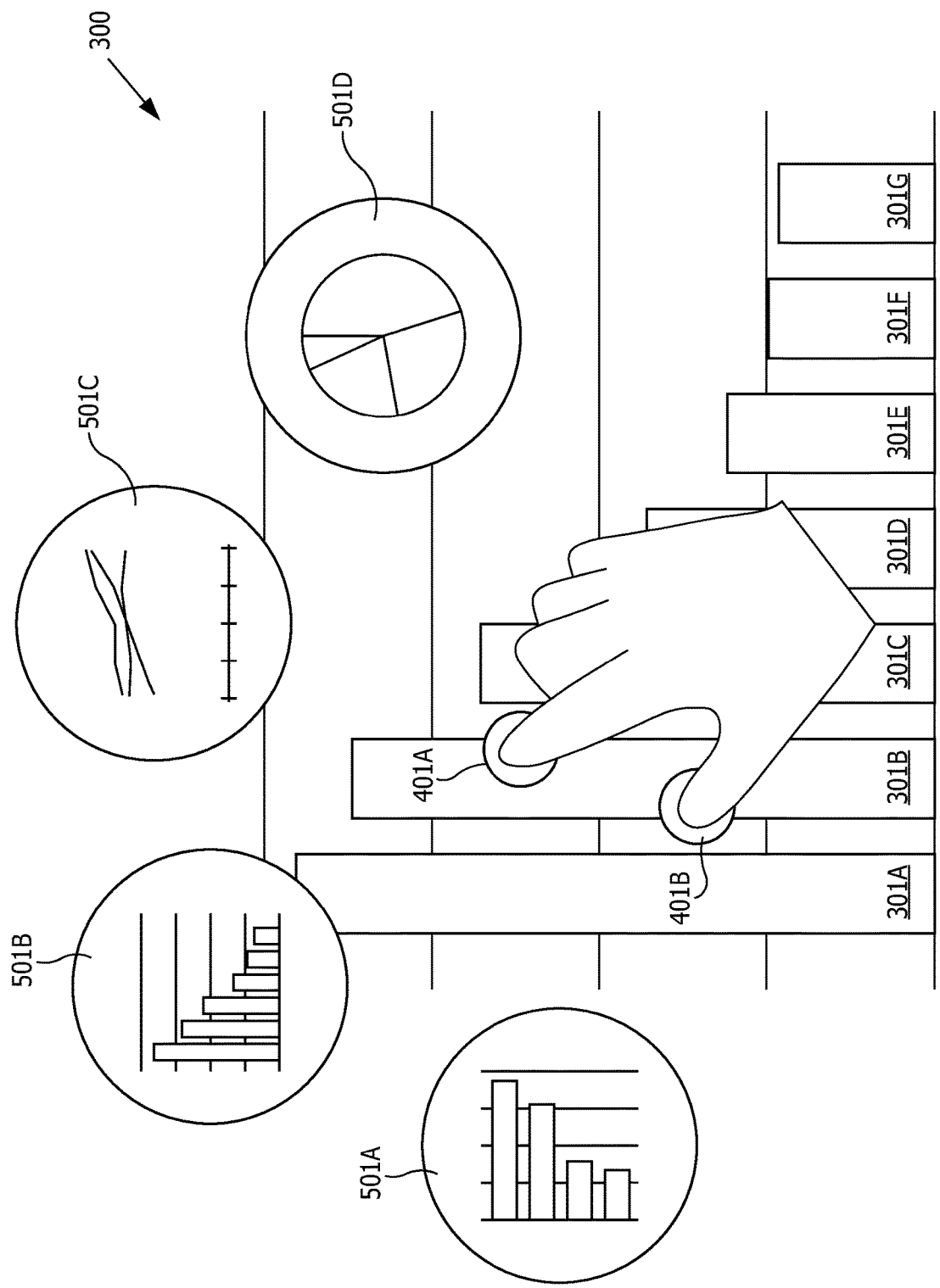

In at least one embodiment, user 100 performs some sort of gesture to activate previews of secondary visualizations, wherein the gesture is detected by input device 102 and/or by a touch-sensitive display screen 103. For example as depicted in FIG. 4, in embodiments wherein display screen 103 is a touch-sensitive screen capable of detecting two or more points of contact, user 100 can activate previews of secondary visualizations by performing a pinch-to-zoom gesture (moving two fingers farther apart from one another while both fingers are touching display screen 103). As depicted in FIGS. 4 and 5, there are two points of contact 401A, 401B; spreading these points 401A, 401B apart by movement of user's 100 fingers causes previews 501A-501D to be displayed. In another embodiment, spreading the fingers may not be required; previews may be activated, for example, by any or all of the following:

- touching the screen (activates previews corresponding to the element being displayed at the contact point);
- touching the screen with at least two fingers (activates previews corresponding to the element being displayed at the contact point or the midpoint between the contact points; also defines an axis that can be used to select a displayed preview, as discussed below; pinch gesture not required);
- causing a cursor to hover at a certain location on the screen (activates previews corresponding to the element being displayed at the hover location);
- clicking a mouse or performing some other activation command while a cursor is at a certain location on the screen (activates previews corresponding to the element at the location);
- entering a keyboard command indicating a location on the screen (activates previews corresponding to the element at the location).

In at least one embodiment, the on-screen location of the input (for example the position of contact points 401A, 401B, or the midpoint between contact points 401A, 401B) determines which portion of the displayed data is to be expanded by presentation of secondary visualizations. Accordingly, in the example of FIG. 5, the four previews 501A-501D depict available secondary visualizations that relate to rectangle 301B, since the initial contact points 401A, 401B correspond to rectangle 301B. In addition, as shown in FIGS. 4 and 5, the particular data element to which the previews 501A-501D relate (in this case, rectangle 301B), can be highlighted or otherwise visually distinguished.

Previews 501 can take any suitable form. For example, as shown in FIG. 5, each preview 501 can be a miniature schematic representation of a type of data visualization that relates to the selected element of the primary data visualization. In this example, each preview 501 depicted in FIG. 5 is a miniature schematic representation of a different type of visualization that relates to the data represented by bar 301B.

In at least one embodiment, previews 501 for all available secondary visualizations are displayed. In at least one embodiment, previews 501 for a subset of available secondary visualizations are shown, for example if there are too many available secondary visualizations to effectively display previews 501 for all of them. The display may scroll through available visualizations, or may present only the most popular or suitable ones, or provide some mechanism for the user 100 to view previews other than those initially displayed. In at least one embodiment, a hierarchy of previews may be established, allowing user 100 to more easily navigate to the one he or she is interested in; such a technique is described in more detail below.

Figure 6:
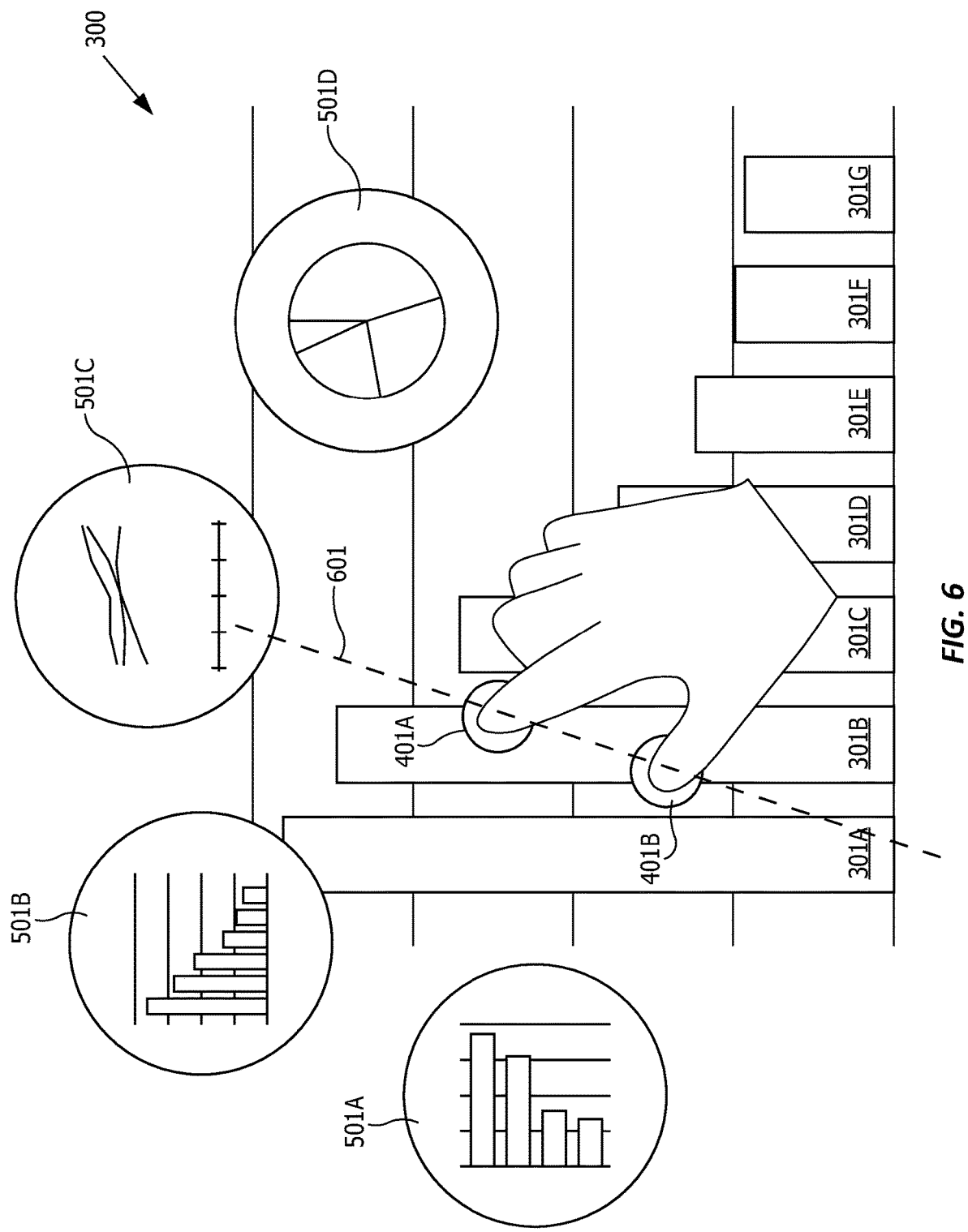

In at least one embodiment, user 100 can provide input 214 to cause one of the displayed previews 501 to be highlighted; the selected preview is highlighted 216. For example, user 100 may tap on one of the displayed previews 501 to cause it to be highlighted. Alternatively, user 100 may rotate the axis of the pinch gesture to cause different previews 501 to be highlighted. For example, as depicted in FIG. 6, axis 601 drawn between contact points 401A and 401B determines which preview 501 to highlight; in this case, preview 501C is highlighted. In at least one embodiment, axis 601 is not actually displayed, but is shown in FIG. 6 merely for illustrative purposes; in another embodiment, axis 601 is displayed.

Figure 7:
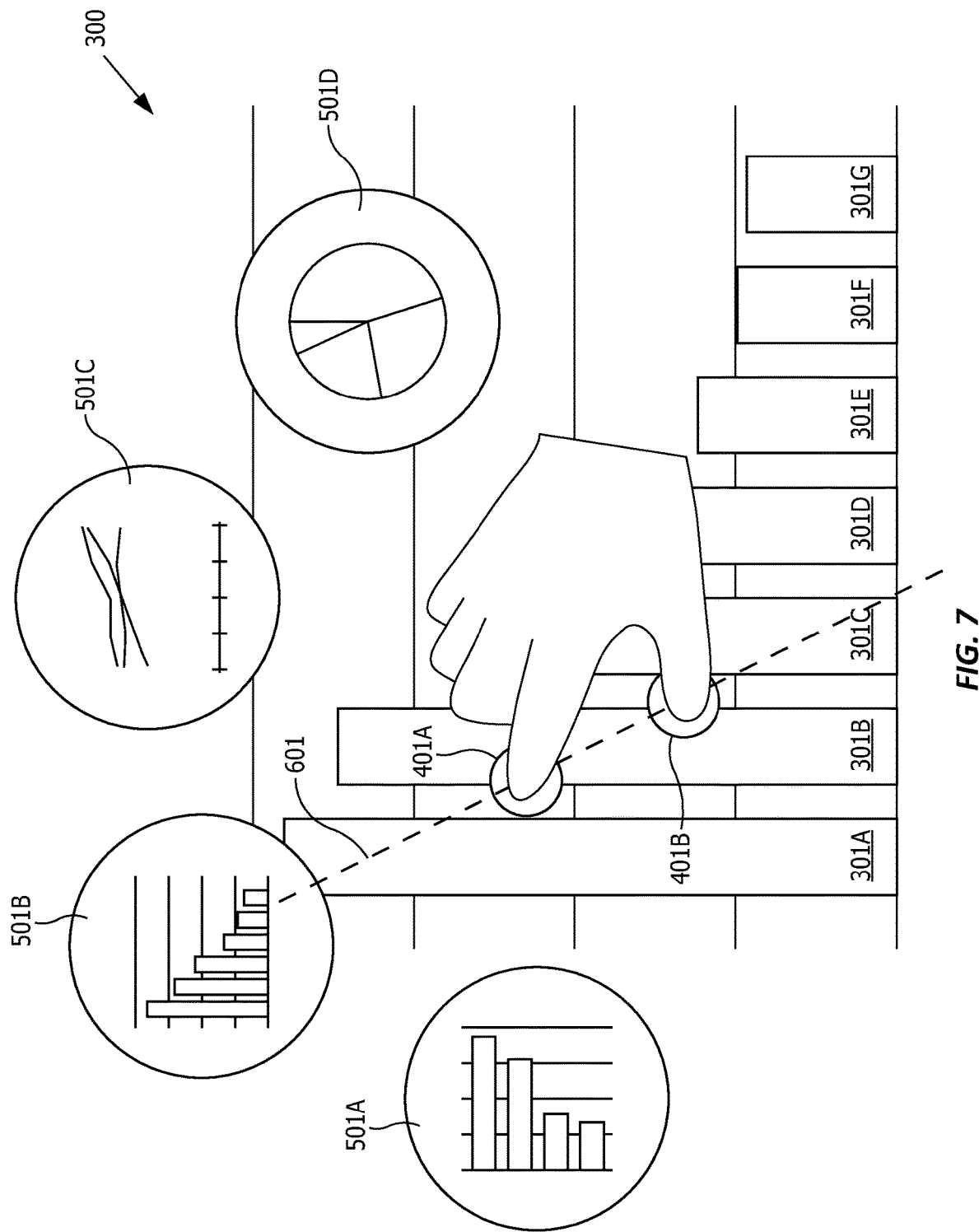

In FIG. 7, user 100 has rotated his or her fingers, causing contact points 401A, 401B to shift position. Axis 601 now points to preview 501B, so that preview is now highlighted.

Figure 8:
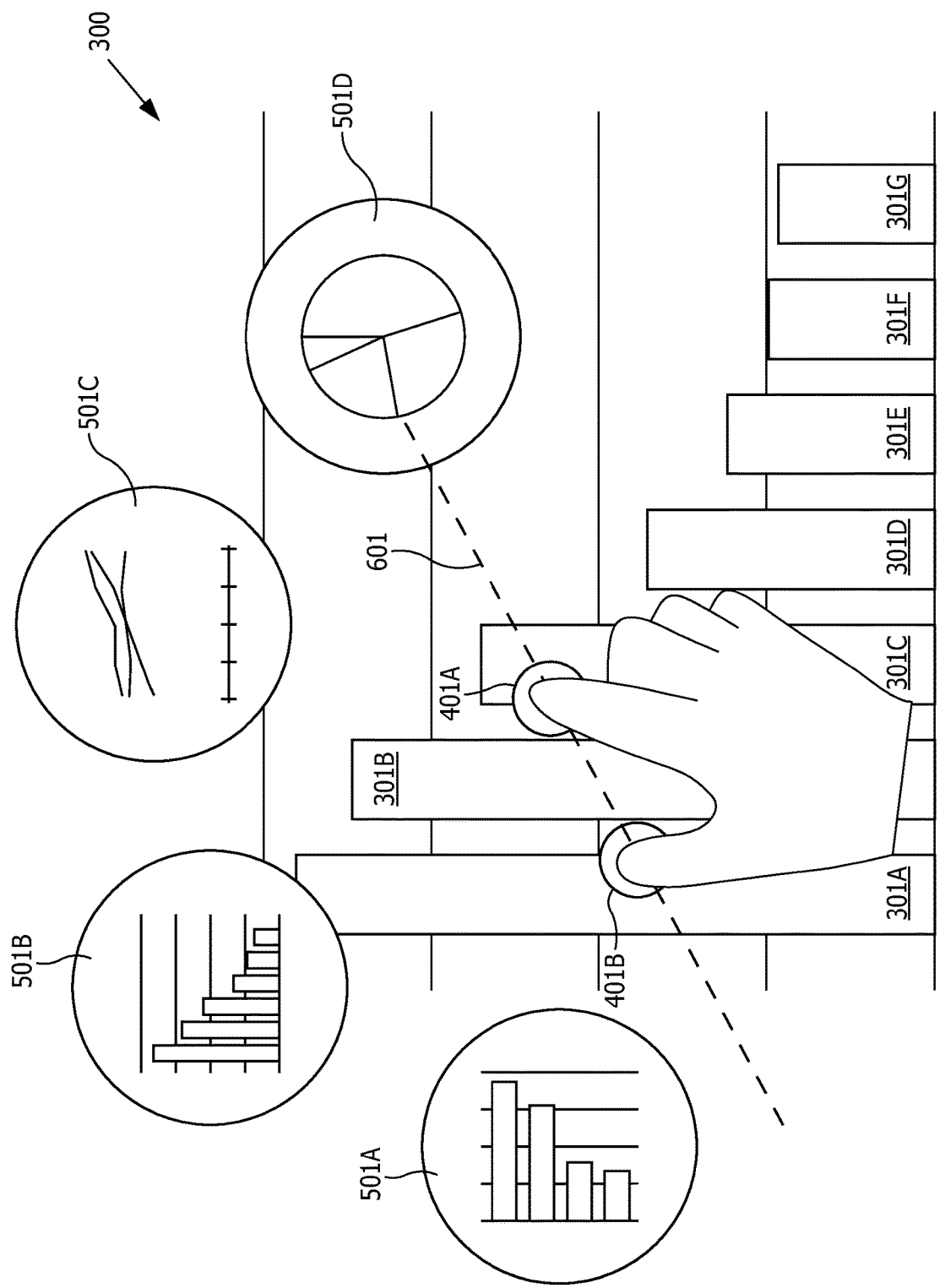

In FIG. 8, user 100 has rotated his or her fingers, causing contact points 401A, 401B to shift position. Axis 601 now points to preview 501D, so that preview is now highlighted.

Highlighted preview 501 can be displayed in any visually distinctive manner. For example, it can be brightened, shown in color (while other previews 501 are black-and-white), enlarged, and/or made dynamic; any other suitable effect may be applied. In at least one embodiment, previews 501 initially depict various types of visualizations without actually containing the visualizations themselves; highlighting a preview 501 may cause that preview to go "live", showing actual data based on the currently selected element of the primary visualization. In at least one embodiment, highlighting a preview 501 causes that preview to be selected for further operations, such as hierarchical navigation, configuration, naming, modification, deletion, and/or the like.

In at least one embodiment, when previews 501 are displayed, the primary visualization is temporarily dismissed, grayed out, blurred, and/or shown in a subdued manner.

In at least one embodiment, additional information may be displayed for a selected preview 501. For example, a text box, ToolTip, or other element containing descriptive information may be shown for a preview 501 when that preview is selected. The descriptive element can be displayed alongside the selected preview 501, or on top of it (for example, in a translucent manner), or at some other location on the display screen. In another embodiment, an audio description (such as speech) of the selected preview 501 can be output on a speaker or similar component.

In at least one embodiment, if user 100 spreads his or her fingers further apart (or otherwise continues the gesture that caused previews 501 to be activated), all previews 501, or the selected preview 501, can dynamically expand in size. Dynamic resizing of previews 501, or the selected preview 501, can continue in response to further gestures by user 100; for example, previews 501, or the selected preview 501, can change their size dynamically based on the user 100 bringing his or her fingers closer together or farther apart.

In at least one embodiment, user 100 can shift finger position(s) with respect to the primary visualization, while previews 501 are being displayed. If user 100 shifts his or her fingers so that the center point between contact points 401A, 401B moves to a different element of the primary visualization (such as a different rectangle 301), the displayed previews 501 can be dynamically updated to reflect the newly selected element of the primary visualization. For example, if user 100 shifts so that the center point is now on rectangle 301C instead of rectangle 301B, previews 501 are updated so that they now depict available secondary visualizations for rectangle 301C. In at least one embodiment, user 100 can move his or her fingers around screen 103 to cause different elements of the primary visualization to be selected and thereby cause different sets of previews 501 to be displayed. In addition, rotation of the axis between contact points 401A, 401B can continue to dynamically change the selected preview 501.

In embodiments using different input modes, such dynamic updating of previews can be performed in manner suited to the particular input mode being used. For example, appropriate mechanisms for changing the set of displayed previews 501, and/or selecting particular previews 501, can be implemented for various types of input devices 102.

Figure 9:
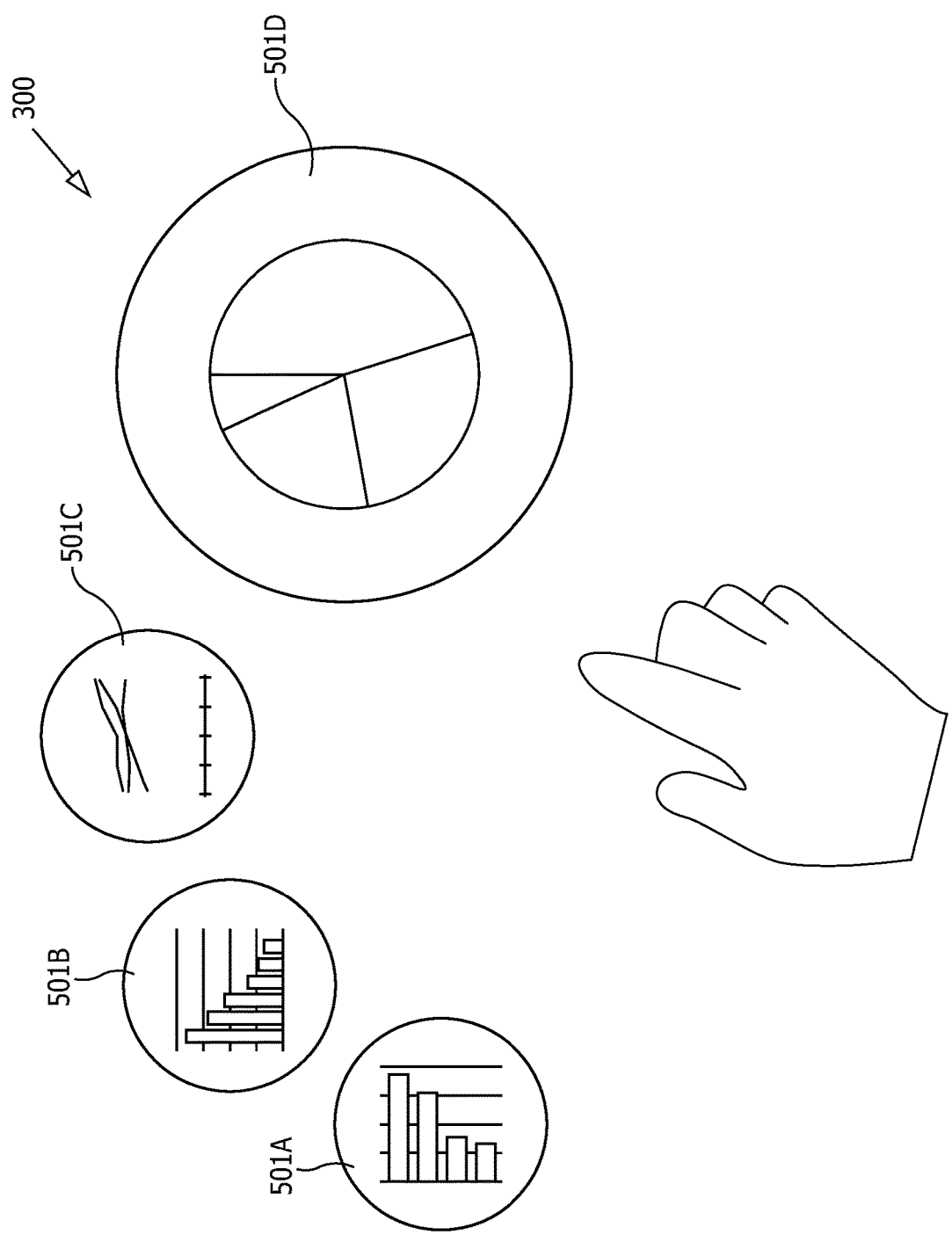
Figure 10:
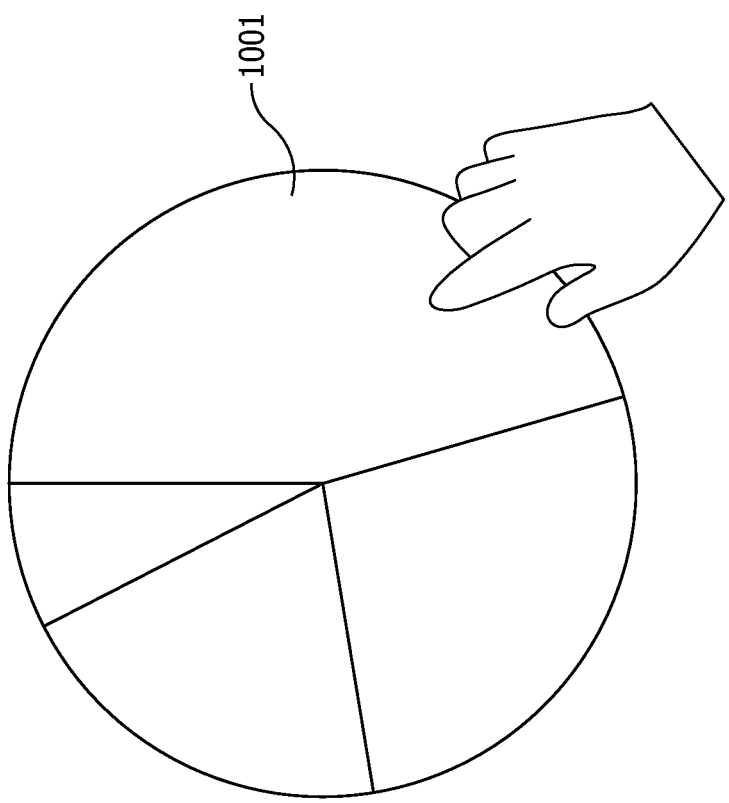
Figure 11:
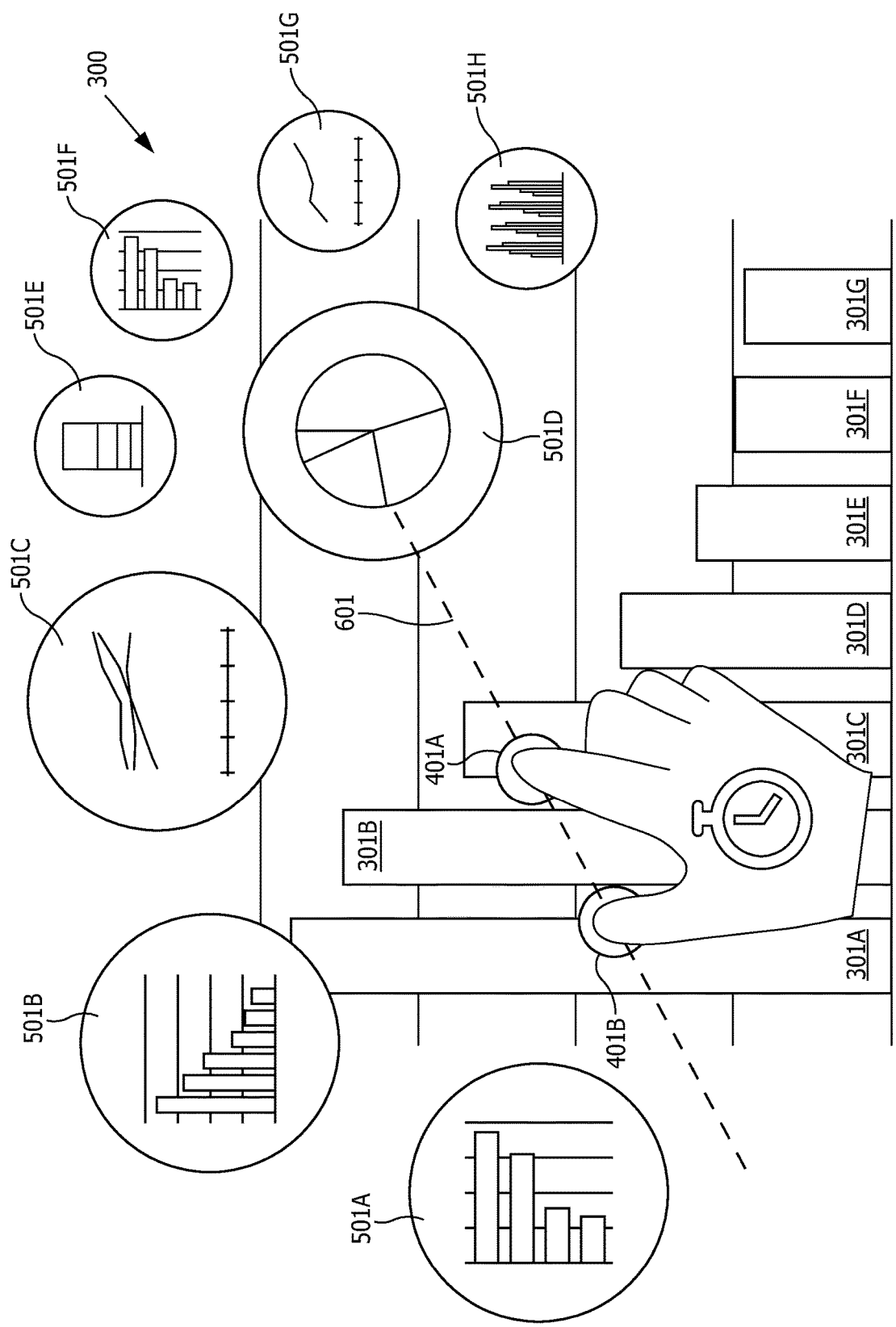
FIGS. 11 through 14 are a series of screen shots illustrating an example of two-level hierarchical expansion of a bar graph data visualization in response to user input, according to one embodiment of the present invention.

In at least one embodiment, user 100 can provide input 215 to cause one of the displayed previews 501 to be expanded; the selected preview is expanded 217. For example, in at least one embodiment, user 100 can remove his or her fingers from screen 103 while a particular preview 501 is selected, to cause that preview 501 to be expanded. Such a technique is depicted in the example of FIGS. 8 to 10. In FIG. 8, user 100 has positioned his or her fingers so that the axis formed by contact points 401A, 401B points to preview 501D, causing that preview 501D to be selected. In FIG. 9, user 100 removes his or her fingers from screen 103; this causes the selected preview 501D to expand. FIG. 10 depicts the completion of the expansion, so that selected preview 501D has transitioned into a full-sized display 1001 of a secondary visualization. Display 1001 may take up all of display screen 103 or some portion of display screen 103. In at least one embodiment, when full-sized display 1001 of a secondary visualization is presented, the primary visualization is dismissed, or subdued, or shown in the background. In at least one embodiment, the expansion of a selected preview 501D into a full-sized display 1001 takes place as a smooth transition. In at least one embodiment, user 100 can interact with the displayed secondary visualization.

In other embodiments, other input mechanisms can be used for invoking expansion of a preview 501. For example, user 100 can tap on or click on a displayed preview 501 to cause it to be expanded 217. Alternatively, user 100 can hit a key, click a mouse, or perform some other input operation to cause a displayed or selected 501 preview to be expanded 217.

Any suitable mechanism can be provided for causing dismissal of full-sized display 1001 of the secondary visualization. For example, user 100 may tap on the secondary visualization to dismiss it or to cause it to transition back to preview form. Alternatively, user 100 can click on a dismiss button, or hit a key, or perform some other input operation to cause the secondary visualization to be dismissed. In at least one embodiment, user 100 can interact with the secondary visualization, for example to perform additional operations to view and/or manipulate various aspects and elements of the secondary visualization in different ways.

In at least one embodiment, while previews 501 are displayed, user 100 can provide input 218 to cause the displayed previews 501 to be dismissed; in response, previews 501 are dismissed 219, and the original form of primary visualization 300 is restored. Any suitable input can be provided for causing such dismissal 219. For example, user 100 can tap on an area of screen 103, or click on a dismiss button, or hit a key, or perform some other input operation to cause previews 501 to be dismissed.

Hierarchy of Visualizations

In at least one embodiment, available secondary visualizations can be organized in a hierarchy. The user can navigate the hierarchy to find and select a particular visualization for viewing and/or activation. The hierarchy can be organized according to any suitable scheme, such as by data type, format, style, and/or the like. Any number of levels can be available within the hierarchy.

Any suitable mechanism can be provided for navigating the hierarchy of visualizations. In at least one embodiment, a hierarchy of previews is made available; a top level can be provided to indicate a particular type of visualization, and subordinate levels of previews can be provided so as to provide the user with information about individual visualizations within the type. In at least one embodiment, so as to avoid cluttering the screen with an excessive number of previews at any given time, each set of second-level previews associated with a particular first-level preview is displayed only when user 100 selects, activates, highlights, or otherwise interacts that corresponding first-level preview. In at least one embodiment, multiple (or all) available sets of second-level previews can be displayed concurrently. In at least one embodiment, user 100 can select which sets of second-level previews should be displayed at any given time. In at least one embodiment, similar techniques can be used for successively lower levels of previews.

Figure 2B:
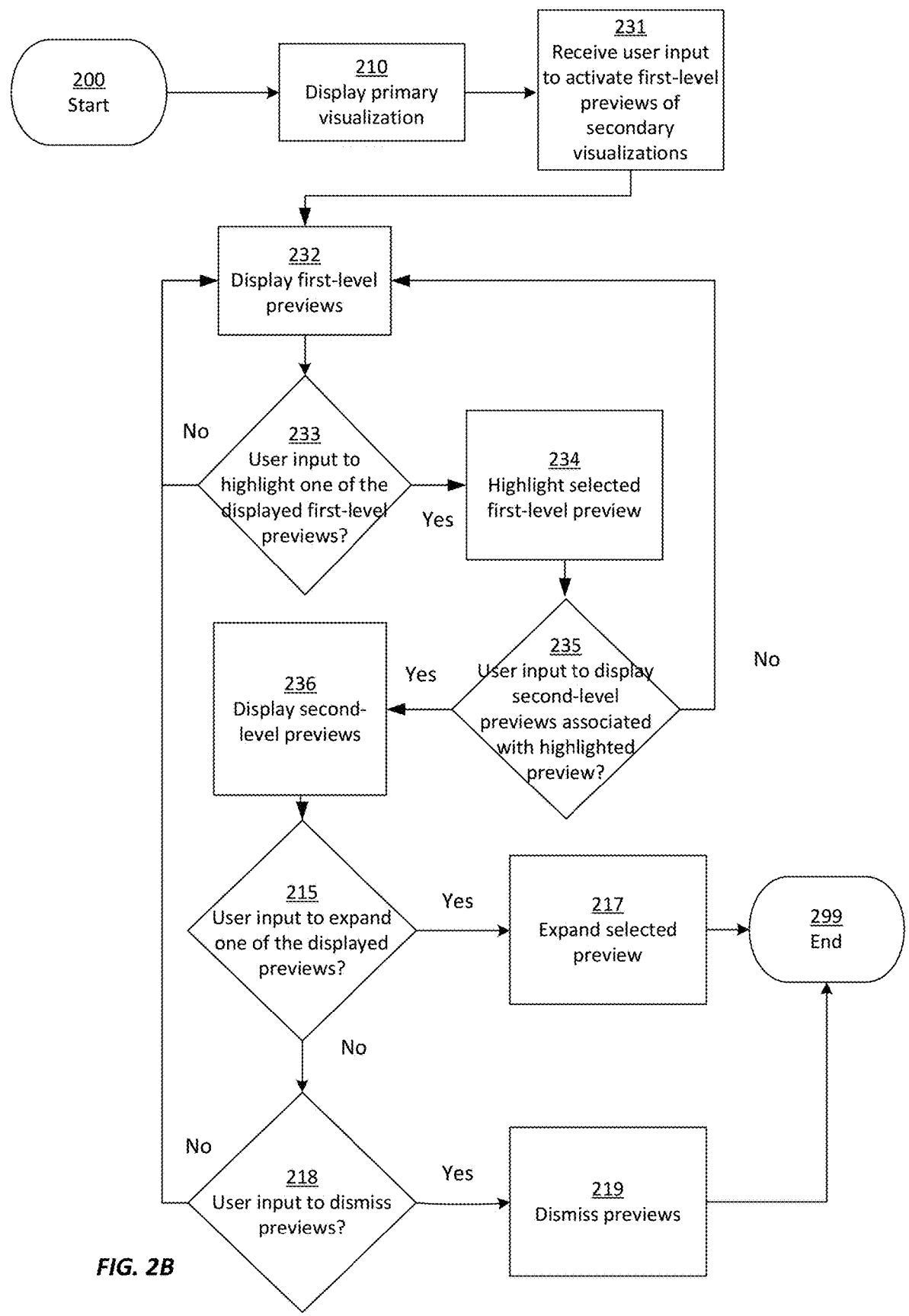
FIG. 2B is a flowchart depicting a method of hierarchical expansion of a data visualization in response to user input, according to one embodiment of the present invention.

Referring now to FIG. 2B, there is shown a flowchart depicting a method of hierarchical expansion of a data visualization in response to user input, according to one embodiment of the present invention. Referring also to FIGS. 11 through 14, there is shown a series of screen shots illustrating an example of two-level hierarchical expansion of a bar graph data visualization in response to user input, according to one embodiment of the present invention.

Although the example of FIGS. 11 through 14 will be used to illustrate the method of FIG. 2B, one skilled in the art will recognize that the particular depictions in the example are merely provided for illustrative purposes, and that the invention can be implemented using other techniques and mechanisms without departing from the essential characteristics of the invention as set forth in the claims.

A primary visualization is displayed 210. In response to receiving 231 user input to activate first-level previews of secondary visualizations, previews are displayed 232. Such display of first-level previews can be performed in a manner similar to that described above in connection with steps 211 and 212 of FIG. 2A.

In at least one embodiment, user 100 can provide input 233 to cause one of the displayed first-level previews to be highlighted; the selected first-level preview is highlighted 234. Such highlighting can be performed in a manner similar to that described above in connection with steps 214 and 216 of FIG. 2A.

In at least one embodiment, user 100 can provide input 235 to cause second-level previews to be displayed for a highlighted first-level preview. In response, second-level previews are displayed 236.

Any suitable mechanism can be used for allowing user 100 to provide input 235 to cause second-level previews to be displayed 236. In the example shown in FIG. 11, second-level previews 501E-H are displayed 236 in response to user 100 holding contact points 401A, 401B relatively steady while a particular first-level preview 501D is displayed. In other embodiments, other trigger actions may cause second-level previews 501E-H to be displayed 236; for example, user 100 can input a command, or tap or double-tap, or perform a gesture, spoken command, or any other input operation to cause second-level previews 501E-H to be displayed.

In the example, only those second-level previews 501E-H associated with the currently selected first-level preview 501D are displayed. If user 100 rotates his or her fingers so that axis 601 no longer points to first-level preview 501D, second-level previews 501E-H are dismissed. One skilled in the art will recognize that other input schemes are possible, including for example a scheme whereby previews are dismissed only upon receipt of explicit input from user 100 to dismiss them.

In the example, selected first-level preview 501D depicts a visualization that is a representative example of a category or type of visualizations. Other visualizations 501E-501H are part of the same category or type. The preview 501D selected for display as a representative example may be selected based on a determination that that visualization is a "best fit" for user's 100 needs, or it can be selected by some other means.

In another embodiment, each first-level preview can instead be an indication of a category or type, rather than a representative example depicting a particular visualization of that category or type; second-level visualizations can belong to the indicated category or type.

In at least one embodiment, the display of second-level previews 501E-501H is persistent; once they are displayed, they remain on the screen to allow user 100 to select among them and/or interact with them. For example, user 100 can drag, tap, click on, or otherwise interact with one of the displayed second-level previews to activate it, causing it to be expanded.

Figure 12:
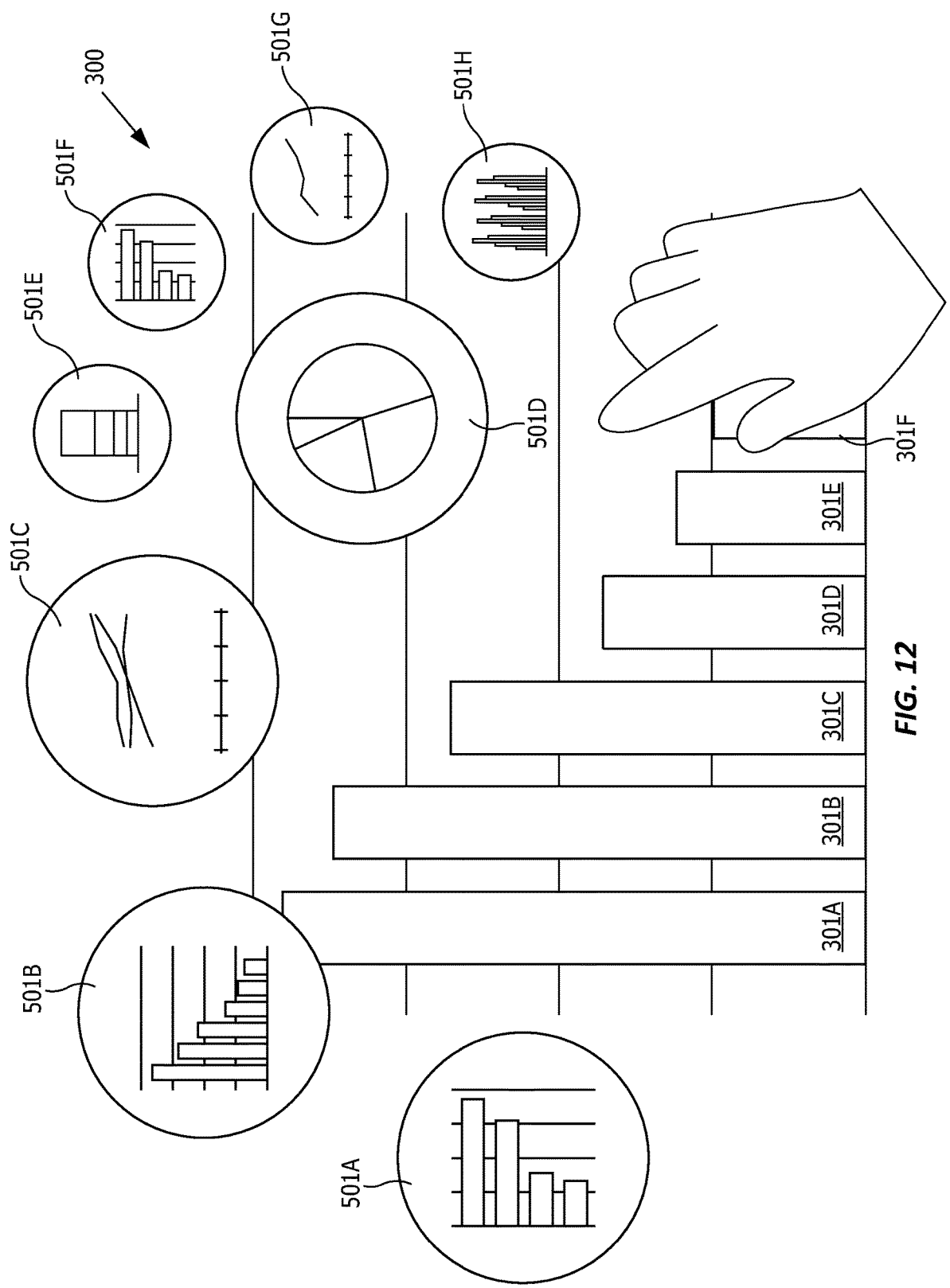

In the example, as shown in FIG. 12, user 100 removes his or her fingers from the screen, and second-level previews 501E-501H are still displayed (along with selected first-level preview 501D and other first-level previews 501A-C). In at least one embodiment, after user 100 removes his or her fingers from the screen, these second-level previews 501E-501H may remain on screen, either until further action by user 100, or for some predefined period of time, after which they may be automatically dismissed.

Referring again to FIG. 2B, user 100 can provide input 215 to cause one of the displayed previews 501 to be expanded; the selected preview is expanded 217. For example, in at least one embodiment, user 100 can tap on a displayed second-level preview 501 to select it. In at least one embodiment, user 100 can rotate contact points 401A, 401B (in a manner similar to that described above in connection with FIGS. 7 and 8) to select among displayed second-level previews 501, by causing an axis 601 defined by the contact points 401A, 401B to rotate to point do different second-level previews 501.

Figure 13:
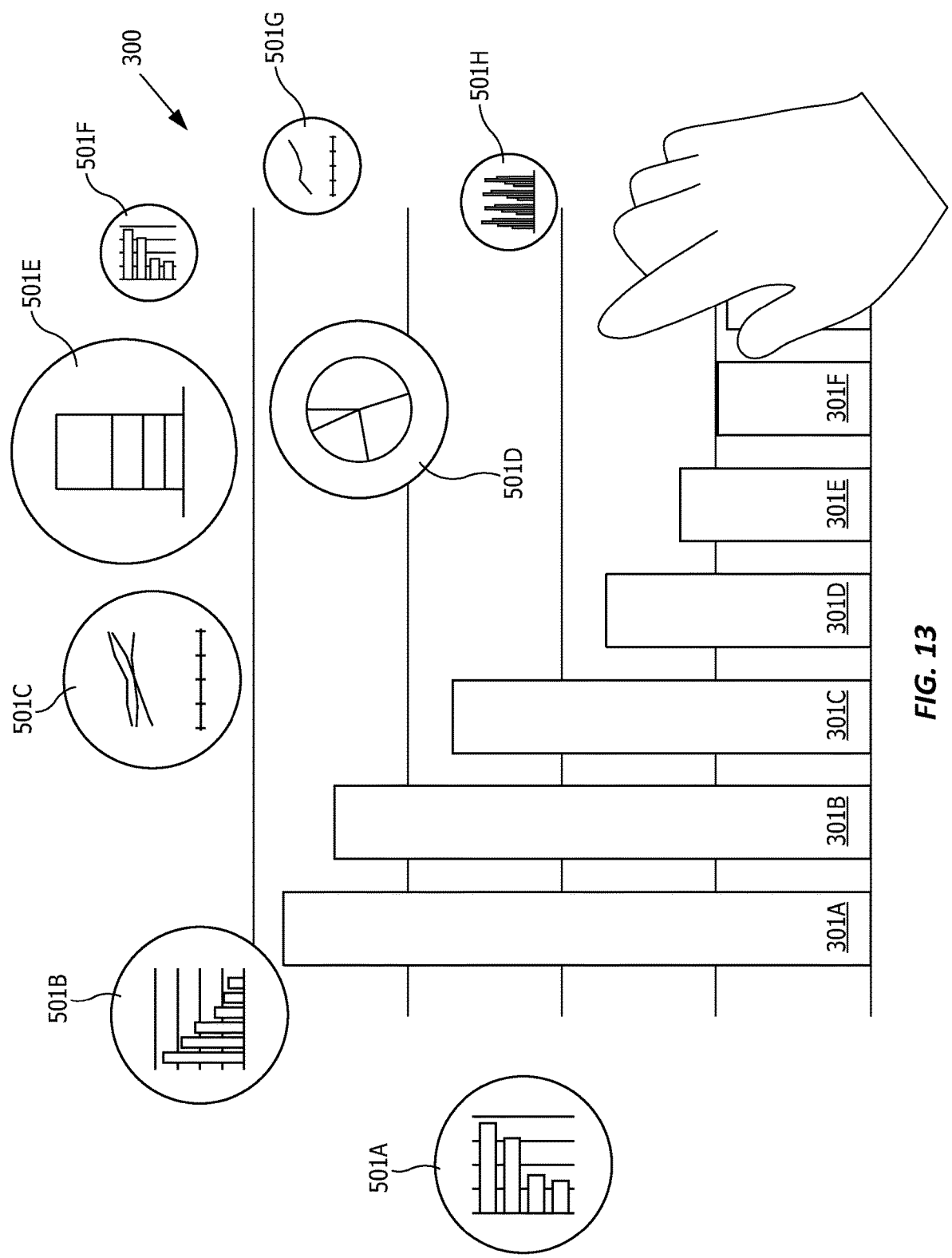
Figure 14:
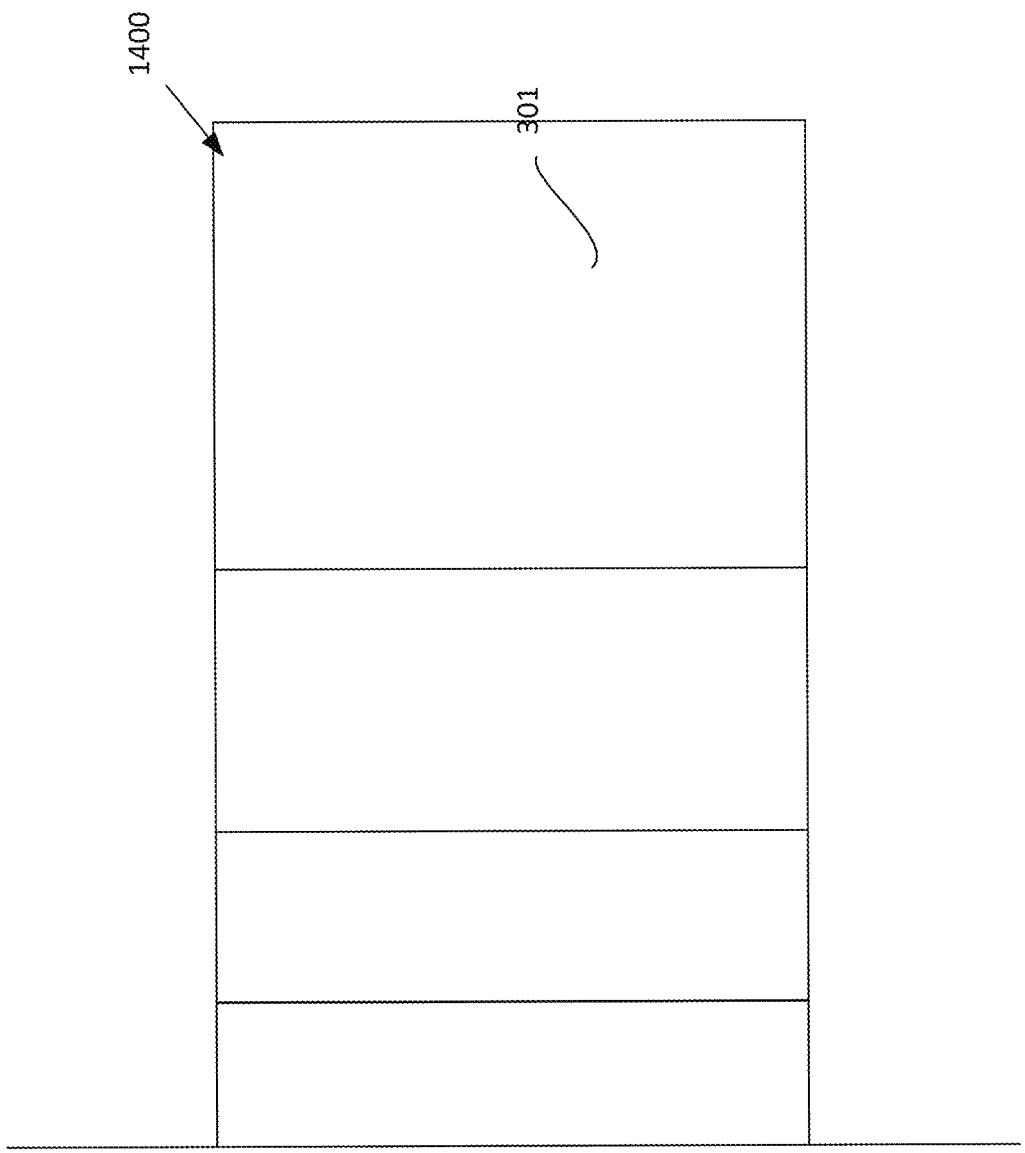

In the example, as shown in FIG. 13, user 100 can select a displayed second-level preview 501E, for example by tapping on it. The selected second-level preview 501E expands so that user 100 can see the associated data visualization. FIG. 14 depicts the displayed visualization 1400, including graph 301 that corresponds to the selected second-level preview 501E.

As described above, all transitions can be implemented in a smooth manner, with previews expanding, changing position, and/or being dismissed gradually using effects such as zooming in/out, fading in/out, and/or dissolving. One skilled in the art will recognize that any suitable transition effects can be used to reinforce relationships between elements as they are moved, introduced, dismissed, or otherwise transitioned from one state to another.

User 100 can dismiss displayed visualization 1400, for example by tapping on or clicking on a dismiss button or icon (not shown), or entering a keyboard command, or by another mechanism. In at least one embodiment, visualization 1400 may automatically be dismissed after some predefined period of time. In at least one embodiment, after visualization 1400 is dismissed, the display may return to its initial state, or to the state that was shown just before visualization 1400 was invoked, or to any other suitable state.

Referring again to FIG. 2B, in at least one embodiment, while previews 501 are displayed, user 100 can provide input 218 to cause the displayed previews 501 to be dismissed; in response, previews 501 are dismissed 219. Any suitable input can be provided for causing such dismissal 219. For example, user 100 can tap on an area of screen 103, or click on a dismiss button, or hit a key, or perform some other input operation to cause previews 501 to be dismissed.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for interacting with a displayed data visualization, comprising:

displaying a primary data visualization on a touch-sensitive display screen, the primary data visualization comprising a plurality of display elements;

receiving, via the touch-sensitive display screen, a first user input including two points of contact with the touch-sensitive display screen, the two points of contact defining an axis having an orientation and the first user input being rotatable about the axis;

responsive to receiving the two points of contact with the touch-sensitive display screen, selecting a first one of the display elements that is centrally positioned between the two points of contact;

responsive to selecting the first one of the display elements, dynamically presenting for display on the touch-sensitive display screen a plurality of previews of secondary data visualizations relating to the first one of the display elements;

receiving a rotation of the first user input causing a rotated orientation of the defined axis, the rotation of the first user input including rotating the two points of contact on the touch-sensitive display screen to rotate the defined axis;

responsive to receiving the rotation of the first user input, highlighting one of the plurality of previews of secondary data visualizations based on the rotated orientation of the defined axis with respect to a display position of the plurality of previews of secondary data visualizations;

receiving a resizing of the first user input on the touch-sensitive display screen, the resizing of the first user input causing a change in a distance between the two points of contact on the rotated defined axis on the touch-sensitive display screen; and responsive to receiving the resizing of the first user input, resizing a presentation of the highlighted one of the plurality of previews of secondary data visualizations.

2. The method of claim 1, further comprising:
receiving, via the touch-sensitive display screen, a second user input selecting one of the plurality previews of secondary data visualizations; and
responsive to receiving the second user input, displaying a secondary data visualization corresponding to the selected one of the plurality of previews of secondary data visualizations.

3. The method of claim 1, wherein dynamically presenting for display the plurality of previews of secondary data visualizations includes displaying the plurality of previews of secondary data visualizations concurrently with a continued display of the primary data visualization on the touch-sensitive display screen.

4. The method of claim 1, wherein the secondary data visualizations comprise different representations of data associated with the first one of the display elements.

5. The method of claim 1, wherein the two points of contact with the touch-sensitive display screen are proximate to a display location of the first one of the display elements and the first one of the display elements is centrally positioned between the two points of contact.

6. The method of claim 1, wherein the two points of contact define a pinch gesture.

7. The computer-implemented method of claim 1, further comprising:
selecting the highlighted one of the plurality of previews of secondary data visualizations, the selected one of the plurality of previews of secondary data visualizations being selected responsive to a user disengaging the two points of contact.

8. The computer-implemented method of claim 1, further comprising:
selecting the highlighted one of the plurality of previews of secondary data visualizations responsive to receiving a movement of the two points of contact apart from one another on the touch-sensitive display screen.

9. The computer-implemented method of claim 1, wherein the highlighted one of the plurality of previews of secondary data visualizations expands to illustrate a selection of the highlighted one of the plurality of previews of secondary data visualization responsive to a user disengaging the two points of contact.

10. A computer-implemented method for interacting with a displayed data visualization, comprising:
displaying a primary data visualization on a touch-sensitive display screen, the primary data visualization comprising a plurality of display elements;
receiving, via the touch-sensitive display screen, a first user input including two points of contact with the touch-sensitive display screen, the two points of contact defining an axis having an orientation and the first user input being rotatable about the axis;
responsive to receiving the two points of contact with the touch-sensitive display screen, selecting a first one of the display elements that is centrally positioned between the two points of contact;
responsive to selecting the first one of the display elements, dynamically presenting for display on the touch-sensitive display screen a plurality of previews of secondary data visualizations relating to the first one of the display elements;
receiving a rotation of the first user input causing a rotated orientation of the defined axis, the rotation of the first user input including rotating the two points of contact on the touch-sensitive display screen to rotate the defined axis;
determining a first one of the plurality of previews of secondary data visualizations based on the rotated orientation of the defined axis, the defined axis being aligned with the first one of the plurality of previews of secondary data visualizations;
receiving a resizing of the first user input on the touch-sensitive display screen, the resizing of the first user input causing a change in a distance between the two points of contact on the rotated defined axis on the touch-sensitive display screen;
responsive to receiving the resizing of the first user input, resizing a presentation of the first one of the plurality of previews of secondary data visualizations; and
receiving, via the touch-sensitive display screen, a second user input selecting the first one of the plurality of previews of secondary data visualizations.

11. The method of claim 10, further comprising:
responsive to receiving the second user input, displaying a secondary data visualization corresponding to the first one of the plurality of previews of secondary data visualizations.

12. The method of claim 10, wherein dynamically presenting for display the plurality of previews of secondary data visualizations includes displaying the plurality of previews of secondary data visualizations concurrently with a continued display of the primary data visualization on the touch-sensitive display screen.

13. The method of claim 10, wherein the secondary data visualizations comprise different representations of data associated with the first one of the display elements.

14. The method of claim 10, wherein the two points of contact with the touch-sensitive display screen are proximate to a display location of the first one of the display elements and the first one of the display elements is centrally positioned between the two points of contact.

15. The method of claim 10, wherein the two points of contact define a pinch gesture.

16. A computer-implemented method for interacting with a displayed data visualization, comprising:
displaying a primary data visualization on a touch-sensitive display screen, the primary data visualization comprising a plurality of display elements;
receiving, via an input device, a first user input including two points of contact with the touch-sensitive display screen, the two points of contact defining a first axis having a first orientation and the first user input being rotatable about the first axis;
responsive to receiving the two points of contact with the touch-sensitive display screen, selecting a first one of the display elements that is centrally positioned between the two points of contact;
responsive to selecting the first one of the display elements, dynamically presenting for display a plurality of previews of secondary data visualizations relating to the first one of the display elements;
receiving, via the touch-sensitive display screen, a second user input highlighting a first one of the plurality of previews of secondary data visualizations that are displayed, the second user input including two points of contact with the touch-sensitive display screen defining a second axis pointing to the first one of the plurality of previews of secondary data visualizations that are displayed, the second axis being a continuation of the first axis and rotatable to highlight a second one of the plurality of previews of secondary data visualizations that are display, wherein rotating the second axis includes rotating the two points of contact associated with the second user input on the touch-sensitive display screen;

receiving a resizing of the second user input on the touch-sensitive display screen, the resizing of the second user input causing a change in a distance between the two points of contact on the rotated second axis on the touch-sensitive display screen; and responsive to receiving the resizing of the second user input, resizing a presentation of the highlighted one of the plurality of previews of secondary data visualizations.

17. A computer-implemented method for interacting with a displayed data visualization, comprising:

displaying a primary data visualization on a touch-sensitive display screen, the primary data visualization comprising a plurality of display elements;

receiving, via the touch-sensitive display screen, a first user input including two points of contact with the touch-sensitive display screen, the two points of contact defining an axis having an orientation and the first user input being rotatable about the axis;

responsive to receiving the two points of contact with the touch-sensitive display screen, selecting a first one of the display elements that is centrally positioned between the two points of contact;

responsive to selecting the first one of the display elements, dynamically presenting for display on the touch-sensitive display screen a plurality of first-level previews of secondary data visualizations relating to the first one of the display elements;

receiving a rotation of the first user input causing a rotated orientation of the defined axis, the rotation of the first user input including rotating the two points of contact on the touch-sensitive display screen to rotate the defined axis;

determining a first one of the plurality of first-level previews of secondary data visualizations based on the rotated orientation of the defined axis, the defined axis being aligned with the first one of the plurality of first-level previews of secondary data visualizations;

receiving a resizing of the first user input on the touch-sensitive display screen, the resizing of the first user input causing a change in a distance between the two points of contact on the rotated defined axis on the touch-sensitive display screen;

responsive to receiving the resizing of the first user input, resizing a presentation of the first one of the plurality of first-level previews of secondary data visualizations;

receiving, via the touch-sensitive display screen, a second user input selecting the first one of the plurality of first-level previews of secondary data visualizations; and responsive to receiving the second user input, displaying a plurality of second-level previews of secondary data visualizations.

18. A system for dynamically expanding a displayed data visualization, comprising:

a processor; and a touch-sensitive display screen, communicatively coupled to the processor, configured to:

display a primary data visualization on the touch-sensitive display screen, the primary data visualization comprising a plurality of display elements;

receive a first user input including two points of contact with the touch-sensitive display screen, the two points of contact defining an axis having an orientation and the first user input being rotatable about the axis;

responsive to receiving the two points of contact with the touch-sensitive display screen, select a first one of the display elements that is centrally positioned between the two points of contact;

responsive to selecting the first one of the display elements, dynamically present for display on the touch-sensitive display screen a plurality of previews of secondary data visualizations relating to the first one of the display elements;

receive a rotation of the first user input causing a rotated orientation of the defined axis, the rotation of the first user input including rotating the two points of contact on the touch-sensitive display screen to rotate the defined axis;

responsive to receiving the rotation of the first user input, highlight one of the plurality of previews of secondary data visualizations that are displayed based on the rotated orientation of the defined axis with respect to a display position of the plurality of previews of secondary data visualizations that are displayed;

receive a resizing of the first user input on the touch-sensitive display screen, the resizing of the first user input causing a change in a distance between the two points of contact on the rotated defined axis the touch-sensitive display screen; and responsive to receiving the resizing of the first user input, resize a presentation of the highlighted one of the plurality of previews of secondary data visualizations.

19. A system for dynamically expanding a displayed data visualization, comprising:

a processor; and a touch-sensitive display screen, communicatively coupled to the processor, configured to:

display a primary data visualization on the touch-sensitive display screen, the primary data visualization comprising a plurality of display elements;

receive a first user input including two points of contact with the touch-sensitive display screen, the two points of contact defining an axis having an orientation and the first user input being rotatable about the axis;

responsive to receiving the two points of contact with the touch-sensitive display screen, select a first one of the display elements that is centrally positioned between the two points of contact;

responsive to selecting the first one of the display elements, dynamically present for display on the touch-sensitive display screen a plurality of previews of secondary data visualizations relating to the first one of the display elements;

receive a second user input including two points of contact with the touch-sensitive display screen selecting one of the plurality of previews of secondary data visualizations that are displayed by specifying an orientation of a second axis associated with the second user input, the second axis being a continuation of the defined axis, the second axis being rotated and aligned with the selected one of the plurality of previews of the plurality of secondary data visualizations that are displayed, wherein rotating the second axis includes rotating the two points of contact associated with the second user input on the touch-sensitive display screen;

receive a resizing of the second user input on the touch-sensitive display screen, the resizing of the second user input causing a change in a distance between the two points of contact on the rotated defined axis on the touch-sensitive display screen; and responsive to receiving the resizing of the second user input, resize a presentation of the selected one of the plurality of previews of secondary data visualizations.

\* \* \* \* \*